US012678735B2

(12) United States Patent　　　　　(10) Patent No.: US 12,678,735 B2
Okano　　　　　　　　　　　　　　　　(45) Date of Patent: Jul. 14, 2026

(54) CARBON DIOXIDE GAS SEPARATION/CONCENTRATION DEVICE CAPABLE OF FEEDING CONDITIONED AIR

(71) Applicant: Hiroshi Okano, Fukuoka (JP)

(72) Inventor: Hiroshi Okano, Fukuoka (JP)

( * ) Notice: Subject to any disclaimer, the term of this patent is extended or adjusted under 35 U.S.C. 154(b) by 358 days.

(21) Appl. No.: 18/561,566

(22) PCT Filed: Sep. 28, 2022

(86) PCT No.: PCT/JP2022/036262
§ 371 (c)(1),
(2) Date: Nov. 16, 2023

(87) PCT Pub. No.: WO2023/127215
PCT Pub. Date: Jul. 6, 2023

(65) Prior Publication Data
US 2024/0261726 A1　　Aug. 8, 2024

(30) Foreign Application Priority Data

Dec. 27, 2021　(JP) ................................. 2021-211907

(51) Int. Cl.
*B01D 53/00*　　(2006.01)
*B01D 53/06*　　(2006.01)
*B01D 53/62*　　(2006.01)

(52) U.S. Cl.
CPC ............. *B01D 53/62* (2013.01); *B01D 53/06* (2013.01); *B01D 2257/504* (2013.01); *B01D 2259/4009* (2013.01)

(58) Field of Classification Search
CPC .. B01D 53/62; B01D 53/06; B01D 2257/504; B01D 2259/4009; B01D 2253/108;
(Continued)

(56) References Cited

U.S. PATENT DOCUMENTS

| 10,406,475 B2 | 9/2019 | Okano |
| 10,837,660 B2 | 11/2020 | Okano |

(Continued)

FOREIGN PATENT DOCUMENTS

| CA | 3 064 029 | 1/2019 |
| CA | 3 077 339 | 10/2019 |

(Continued)

OTHER PUBLICATIONS

International Search Report dated Nov. 15, 2022 in International Patent Application No. PCT/JP2022/036262.

(Continued)

*Primary Examiner* — T. Bennett Mckenzie
(74) *Attorney, Agent, or Firm* — STAAS & HALSEY LLP

(57) ABSTRACT

A system separates and concentrates carbon dioxide not only from exhaust gas, but also from air conditioned air. A carbon dioxide gas sorption rotor is rotated in a foam module board laminated unit structure casing, which is divided and sealed into at least a processing gas zone, a recovery zone, and a desorption zone in the order of the rotor rotation direction. Carbon dioxide gas is sorbed in the processing gas zone while evaporating and cooling the honeycomb in a wet state. The carbon dioxide gas is sorbed by condensation heat by introducing saturated vapor into the sorption zone. The carbon dioxide gas is then purged through the recovery zone at the front of the rotation direction. This prevents thermal and oxidative degradation of the sorbent, and at the same time, carbon dioxide gas can be efficiently separated, concentrated, and recovered.

14 Claims, 18 Drawing Sheets

(58) Field of Classification Search
CPC ........ B01D 2258/0283; B01D 2258/06; B01D 2259/4508; B01D 53/1475; B01D 47/022; B01D 53/002; B01D 53/1412; B01D 53/261; B01D 53/263; C01B 32/50; Y02C 20/40; Y02P 20/151
USPC .......................................................... 96/154
See application file for complete search history.

(56) References Cited

U.S. PATENT DOCUMENTS

| | | | | |
|---|---|---|---|---|
| 10,933,371 | B2 | 3/2021 | Okano | |
| 11,058,988 | B2 | 7/2021 | Okano | |
| 11,358,097 | B2 | 6/2022 | Okano | |
| 2012/0000365 | A1* | 1/2012 | Okano | B01D 53/261 96/144 |
| 2015/0008366 | A1 | 1/2015 | Elliott et al. | |
| 2016/0271556 | A1* | 9/2016 | Okano | B01D 53/83 |
| 2020/0001233 | A1 | 1/2020 | Okano | |
| 2021/0039036 | A1 | 2/2021 | Okano | |

FOREIGN PATENT DOCUMENTS

| | | |
|---|---|---|
| CA | 3 077 343 | 3/2020 |
| CN | 107915227 A | 4/2018 |
| CN | 110030654 A | 7/2019 |
| CN | 110290850 A | 9/2019 |
| CN | 111278529 A | 6/2020 |
| CN | 111278530 A | 6/2020 |
| CN | 109323352 B | 7/2021 |
| JP | 2673300 | 11/1997 |
| JP | 11-132522 | 5/1999 |
| JP | 11-309330 | 11/1999 |
| JP | 2000-37611 | 2/2000 |
| JP | 2002-298899 | 10/2002 |
| JP | 2011-94821 | 5/2011 |
| JP | 2012-5943 | 1/2012 |
| JP | 2016-175014 | 10/2016 |
| JP | 6181835 | 8/2017 |
| JP | 6408082 | 10/2018 |
| JP | 2019-13906 | 1/2019 |
| JP | 2019-25482 | 2/2019 |
| JP | 6498483 | 4/2019 |
| JP | 6510702 | 5/2019 |
| JP | 6603299 | 11/2019 |
| JP | 6605548 | 11/2019 |
| JP | 6632005 | 1/2020 |
| JP | 2020-69423 | 5/2020 |
| JP | 6916078 | 7/2021 |
| KR | 10-2010-0077217 | 7/2010 |
| KR | 10-2511403 | 3/2023 |
| TW | 1757523 B | 3/2022 |
| TW | 1786215 B | 12/2022 |
| WO | WO 2015/103401 A1 | 7/2015 |
| WO | WO 2016/005226 A1 | 1/2016 |
| WO | WO 2019/012873 A1 | 1/2019 |
| WO | WO 2019/187582 A1 | 10/2019 |
| WO | WO 2020/044944 A1 | 3/2020 |

OTHER PUBLICATIONS

Office Action dated Jul. 26, 2022 in Japanese Patent Application No. 2021-211907.

Office Action dated Jul. 6, 2022 in Japanese Patent Application No. 2021-211907.

Office Action dated Mar. 29, 2022 in Japanese Patent Application No. 2021-211907.

* cited by examiner

Desorption circulating gas volume and recovered CO₂ concentration

CARBON DIOXIDE GAS SEPARATION/CONCENTRATION DEVICE CAPABLE OF FEEDING CONDITIONED AIR

CROSS REFERENCE TO RELATED APPLICATIONS

This application is a U.S. National Stage Application, which claims the benefit under 35 U.S.C. § 371 of International Patent Application No. PCT/JP2022/036262 filed Sep. 28, 2022, which claims the foreign priority benefit under 35 U.S.C. § 119 of Japanese Patent Application No. 2021-211907 filed Dec. 27, 2021 the contents of which are incorporated herein by reference.

BACKGROUND

A wet TSA carbon dioxide gas separation and concentration system can recover carbon dioxide gas from the air at a high recovery rate, can concentrate it to a high concentration, is highly durable, can utilize waste heat of around 100° C., has low energy consumption, is inexpensive and easy to compact. Furthermore, the air with low carbon dioxide concentration from which carbon dioxide gas is recovered can be supplied for air conditioning.

As a countermeasure against global warming, efforts are being made at the global level to reduce as much as possible the carbon dioxide gases emitted from industry, automobiles, and homes. For example, efforts to replace energy-intensive equipment with energy-efficient models. Other technologies include: the use of renewable energy sources such as solar and wind power instead of fossil fuels; technology to separate and concentrate carbon dioxide gas from large-scale carbon dioxide gas generators such as thermal power plants and store it underground or in deep water; the enhanced oil recovery method (CO2-EOR), in which carbon dioxide gas is injected into oil fields at the end of the oil extraction process to increase oil production; and technology to capture carbon dioxide gas from the atmosphere and recycle it as fuel or other energy source.

In the context of the above efforts, the inventor is concerned with technology that enables high concentration of carbon dioxide gas to be separated from the atmosphere or air conditioning air, rather than from gases emitted from thermal power plants, combustion furnaces, etc. As the system can be miniaturized, it can be installed adjacent to the location where the recovered carbon dioxide gas is used. Thermal power plants are most widely used for power generation using fossil fuels such as coal, petroleum, and natural gas as fuel. Thermal power plants are characterized by inexpensive fuel, a long history and proven technology, and the ability to provide a stable supply of electricity. However, thermal power plants emit carbon dioxide gas, which contributes to global warming.

As a countermeasure, various reuse methods have been researched and developed, including separation, recovery, and concentration of carbon dioxide gas from flue gas, storage of the recovered carbon dioxide gas in the ground or deep sea, or use in enhanced oil recovery (CO2-EOR), and various other reuse methods have been researched and developed. Various methods of carbon dioxide gas separation and concentration have been proposed, including deep cooling, absorption, adsorption, and membrane separation.

The deep-cooling method is a method of liquefying and separating carbon dioxide gas by pressurizing the feed gas and utilizing the difference in liquefaction temperature of each gas under pressure. The power for the compressor to compress the gas and the power for the chiller to deep-cool the gas are required. For example, if the concentration of carbon dioxide gas is around 10%, the other 90% of the gas that does not need to be recovered must be compressed and deep-cooled together, which has the disadvantage of excessive energy consumption. The absorption method is already in practical use, in which carbon dioxide gas is collected by absorbing it into an amine-based alkaline solution such as monoethanolamine and then heating it to desorb and concentrate the carbon dioxide gas. In addition, the concentration of amine solution is around 30%, and around 70% is water, and the heat capacity of the liquid handled is enormous, so even if heat exchangers are placed at key points and heat is recovered, we are approaching the limit of energy conservation.

The adsorption method uses gas adsorbents such as zeolite or activated carbon, and includes the PSA (pressure swing adsorption), which uses pressure differences for adsorption and desorption, and the thermal swing adsorption (TSA method), which uses temperature differences for adsorption and desorption. The PSA method uses the principle that the amount of carbon dioxide gas adsorbed changes with pressure to adsorb only carbon dioxide gas under pressure. This method requires a high-pressure vessel, and precision equipment such as solenoid valves, compressors, and vacuum pumps are also needed as peripheral equipment, making it difficult to scale up.

The TSA method is used to recover carbon dioxide gas by adsorbing carbon dioxide gas from exhaust gas at temperatures below 50 degrees Celsius and desorbing the gas with gas heated to around 100-200 degrees Celsius.

The multi-tower method, in which multiple adsorption columns filled with carbon dioxide adsorbent are alternately switched between adsorption and regeneration, has drawbacks such as high gas pressure loss, inevitable fluctuations in concentration and pressure due to switching between columns, and difficulty in making the system larger.

Among the TSA methods, dehumidification technology using a rotating adsorption honeycomb rotor, which has low pressure loss and can be made larger, and technology to recover and concentrate organic solvents from paint exhaust, etc., have also been put to practical use.

The inlet and outlet of the rotor are partitioned by sectors to form multiple zones, and the flow of process gas and desorption gas into each zone has been devised to improve performance.

A gas adsorber to dehumidify to the extreme ultra-low dew point temperature (Patent Document 1, JP 267330) and methods to concentrate dilute VOCs to as high a concentration as possible (Patent Document 2, JP H11-309330, and Patent Document3, JP 2000-37611) have also been disclosed.

Concentration of carbon dioxide gas has also been studied, with the separation and concentration of carbon dioxide gas from combustion exhaust gas disclosed in Patent Document 4, JP 6498483, and carbon dioxide gas separation and air conditioning in the atmosphere disclosed in Patent Document 5, JP 2011-94821.

However, it has been found that the conventional TSA method for carbon dioxide gas has reached its limits in terms of recovery rate, concentration, and energy conservation.

Patent Document 6, JP 2020-69423 discloses a technology for desorption/concentration using superheated steam in the form of a moving bed of granular adsorbent instead of a honeycomb rotor, but it has many issues such as recovery costs.

The present inventor has conducted research and development of Patent Document 7, JP 6605548, Patent Document 8, JP 6408082, Patent Document 9, JP6510702, and Patent Document 10, JP 6632005, which use saturated steam for regeneration and desorption as new technology, but there are still many problems to be solved in terms of carbon dioxide gas recovery efficiency, concentration, low cost, energy saving, and so on. In recent years, especially in foreign countries, technologies for the direct capture of carbon dioxide gas from the atmosphere (Direct Air Capture, hereinafter referred to as "DAC") have been developed and tested. The advantages of DAC are (1) it can target dispersed and mobile emission sources such as automobiles and airplanes. (2) It can also be applied to carbon dioxide gases emitted in the past. (3) The location of the recovery equipment is not restricted by the emission source, and the carbon dioxide feedstock can be obtained in the vicinity of the plant where it is to be reused. Because of these features, large-scale demonstration tests are being conducted in Europe and the United States.

On the other hand, carbon dioxide gas is in constant demand for welding, medical use, food storage, and other applications, and its raw gas is recovered and used as a byproduct in petrochemical plants and ammonia synthesis plants. Ammonia is the most abundant chemical produced by mankind and is used as a fertilizer for 70% of the world's population, and the carbon dioxide emitted during its production process exceeds 3% of total emissions. Ammonia is gaining attention as a fuel that does not emit carbon dioxide gas, but its production process uses fossil fuels such as natural gas, which emits carbon dioxide gas. The carbon dioxide gas generated is recovered and utilized, but the carbon dioxide gas that cannot be recovered is emitted into the atmosphere, contributing to global warming.

In the future, due to concerns about the generation of carbon dioxide gas from conventional ammonia production methods and environmental pollution caused by plastic waste, it is expected that resource recycling will be promoted and production methods with less environmental impact will be reexamined. In the future, product carbon dioxide sources are expected to shift to renewable sources.

Proposed herein is a method for separating and concentrating carbon dioxide gas not only from exhaust gas from power plants, etc., but also from outdoor air or air-conditioned air, and proposes a wet TSA method carbon dioxide gas separation and concentration system that has high recovery rate, high concentration, compact size, low cost, high durability, and high thermal efficiency.

Adsorption and absorption phenomena are different but similar, and the term sorption is sometimes used when both elements are present. For example, even if the ion exchange resin being considered for carbon dioxide gas recovery is a gel type, there are pores filled with water due to water content, and carbon dioxide is thought to diffuse into the pores and sorb onto the fixed amine groups on the inner surface of the pores, which is similar to the sorption and removal of organic substances by activated carbon in water.

As with the use of the terms "water" and "water vapor," carbon dioxide is used for chemical and molecular expressions, while carbon dioxide gas is used when the term clearly refers to a gas. Furthermore, carbon dioxide gas recovery rate and carbon dioxide concentration are simply described as recovery rate and concentration, respectively.

When dehumidified air from a dehumidifier is the objective, the term "treatment/regeneration" is used for the sorbent, and when the objective is to concentrate VOC gas substances, the term "sorption/desorption" is used for the gas substances to be recovered. Although the expressions "treatment/regeneration" and "sorption/desorption" are used interchangeably in the text, the difference is whether the sorbent is the main substance or the gas, and they mean the same operation in terms of phenomena. Both expressions are used to follow the cited literature or to provide an easy-to-understand explanation depending on the situation at the time.

Limits to High Performance

The one disclosed in Patent Document 4 is an improved version of the conventional dry TSA method for concentrating and recovering carbon dioxide gas from flue gas using a zeolite honeycomb rotor capable of adsorbing carbon dioxide. It is a TSA rotor concentration method that has been devised to remove cooling and adsorption heat from the rotor, to pursue energy savings, and to improve the recovery rate and concentration of recovered gas.

Even when combining the method of repeatedly circulating the cooling zone (i.e., adsorption zone) while cooling the adsorption exit gas to increase the recovery rate, repeatedly circulating the desorption zone while heating the desorbed CO2 gas to increase the recovery concentration, and a special purging method, the recovery rate and recovery concentration are limited to about 60% and 75%, respectively.

The trade-off relationship is that if one of the two is increased, the other is decreased. Also, since the adsorption and desorption gases must be circulated multiple times, the diameter of the rotor must be more than twice that of the rotor used for dehumidification or VOC concentration, as shown in the 8th patent document.

As described above, even with the innovation of carbon dioxide sorbent, it is clear that further significant improvement in performance cannot be expected as an extension of the conventional dry TSA method, and a breakthrough with a completely new idea is needed.

Larger Rotor and Excessive Regenerative Airflow

The one disclosed in the patent document 5 has been researched and developed to improve the energy efficiency of air conditioning by separating and removing carbon dioxide gas from air conditioned air or atmosphere and supplying air to air conditioners. However, the concentration of separated carbon dioxide gas was around 1000 ppm, requiring a large amount of regenerated air with the same air volume as the treated air, resulting in a large rotor, and the installation space and cost of large supply and exhaust ducts for regeneration were issues.

Performance degradation and energy loss due to water vapor intervention Those disclosed in Patent Documents 7, 8, and 9 are inventions of the wet TSA method, aiming for a breakthrough based on the above research experience and findings.

For comparison, the problems of the conventional dry TSA method are described below.

In the conventional dry TSA method, water vapor is also adsorbed during carbon dioxide sorption, generating heat of adsorption and inhibiting the sorption of carbon dioxide gas. In addition, significant energy loss is generated during CO2 gas desorption due to the consumption of desorption heat of adsorption water.

Patent document 6 discloses a method for recovering highly concentrated carbon dioxide gas by sorbing carbon dioxide gas from furnace exhaust gas using amine-impregnated spherical silica gel in a moving bed system and regenerating and desorbing the gas with superheated steam. However, it is difficult to apply the wet TSA method to packed beds, moving beds, and fluidized beds using spherical silica gel. This is because flow channel blockage and deflected flow caused by condensate, or particle adhesion and aggregation caused by the surface tension of the condensate, can cause problems.

To avoid such problems, spherical silica gel with a particle size of 1 mm or larger must be selected. However, when the particle size is larger than 1 mm, the deep center of the silica gel, where the reaction is slow, becomes thermodynamically heavy compared to the surface layer, where the reaction is fast. In other words, the deep part, where sorption and desorption are slow, acts as a sensible heat accumulator, and the water adsorbed in the deep part also adds to the sensible heat storage. In other words, the deep center of the slow-reacting spherical silica gel stores heat during heating of desorption and delays the onset of desorption, resulting in excessive and harmful condensate, and during sorption, it becomes a heat load that delays the onset of sorption.

In addition, if the balance between condensation and evaporation of water vapor during sorption and desorption is disrupted, condensate accumulates, which interferes with continuous operation, requiring a drying process and an additional cooling process.

Patent document 6, a drying process must be added after the desorption process to treat the excess condensate due to an imbalance between condensation and evaporation, and a method to control and supply steam superheat temperature is proposed as a way to avoid this, but the energy efficiency becomes poor.

The sorbent used in the wet TSA method is a 0.1 mm thick sorbent disclosed in Patent Document 7 or a polymer sheet having a carbon dioxide sorption function with a thickness of 1 mm or less, as disclosed in Patent Document 7, or a sheet of particles with a diameter of 1 mm or less as disclosed in Patent Document 8, as disclosed in Patent Document 9. The sorbent is made by honeycombing a sheet of carbon dioxide sorbent with particles of 1 mm or less in diameter as disclosed in Patent Document 8, so that the condensation-evaporation balance is difficult to break and no adverse effects from condensate occur. In addition, Patent Document 10 discloses a method of using a sorbent that is not honeycomb-shaped, but instead is formed of laminated sheets with granular sorbent dispersed and supported. According to this method, the granular sorbent is fixed at a distance, so it is not subject to adverse effects such as particle association due to the surface tension of condensate or flow channel blockage due to capillary force. In none of the patents 7, 8, 9, and 10, the behavior of condensate is not moving outflow from the surface of the particles or honeycomb. Therefore, the aforementioned problem of excess condensate treatment due to the thermal behavior of the particle layer with a diameter of 1 mm or more does not occur. Therefore, no drying process or cooling process after desorption, nor superheated steam to control the amount of condensate, is required.

The wet TSA method uses saturated steam of nearly 100° C., rather than superheated steam, for the desorption of carbon dioxide gas, and the condensation heat of the saturated steam is used to gas can be concentrated and recovered at high concentration by the condensation heat of the saturated vapor, and the moisture condensed from the vapor during desorption remains on the inner surface of the honeycomb. Since the heat of sorption of carbon dioxide gas is removed while the moisture evaporates and cools in the processing zone, the sorption performance of carbon dioxide gas is dramatically improved. However, the technologies disclosed in Patents 7, 8, 9, and 10 are insufficient in terms of recovery rate, recovery concentration, energy efficiency, and cost reduction, and issues remain.

Technical Problem 1: Thermal and Oxidative Degradation of Sorbent

There is a trade-off between preventing thermal and oxidative degradation of amine-based carbon dioxide sorbent and improving performance by increasing the desorption temperature, and this is always an important issue.

Patent document 5, an amine-based weakly basic ion exchange resin capable of carbon dioxide gas separation was employed, and experiments were conducted using a low-temperature regeneration method to avoid thermal and oxidative degradation of the sorbent. However, it was found that even at a low regeneration temperature of about 45° C., the performance of the sorbent deteriorated markedly in a short time in dry air.

In the 11th patent document, WO2016/005226, technology is disclosed to reduce the pressure to 20-400 mb to reduce the oxygen concentration to avoid oxidative degradation of the amine-functionalized sorbent and to prevent air and other gases from mixing with the recovered carbon dioxide gas, thereby increasing the purity of the recovered carbon dioxide gas.

Also disclosed is a method of pre-purging the sorbent chamber with inert gas to remove oxygen-containing gases prior to the desorption operation, but there are many factors that increase costs, such as depressurization equipment, pressure resistance of the equipment, and inert gas costs.

In the 12th patent document, Japanese patent application No. 2018-23976, oxygen is removed from the sorption path by purging it with inert gas before moving from the sorption process to the desorption process. It also discloses a method of cooling the sorbent structure with inert gas before returning to the sorption process to prevent oxidative damage to the sorbent. However, in the method of purging with inert gas, the cost of inert gas and the initial cost of purging equipment become an issue, and it is also necessary to consider the decrease in carbon dioxide concentration due to contamination of purge gas.

In Patent Document 13, WO2015/103401, a rotary type sorption/concentration device with a sealable regeneration box and a method of preventing thermal and oxidative degradation by reducing pressure and cooling the box with an exhaust pump and lowering the oxygen concentration is disclosed. However, the method of using an exhaust pump to reduce pressure has the initial and running costs of an exhaust pump, as well as the cost of a sealable regeneration box, which requires pressure resistance and is difficult to maintain.

In Patent Document 9, the wet TSA method discloses a method of configuring a gas circulation path connecting the inlet and outlet of the desorption zone and circulating the mixture of carbon dioxide gas and water vapor that leaves the desorption zone while supplying saturated vapor to the gas.

This reduces the oxygen concentration of the sorption gas, prevents thermal and oxidative deterioration of the carbon dioxide sorbent, and improves durability. However, although this method has achieved a certain level of effectiveness, it is based on the principle of using a heated mixture of carbon dioxide gas and water vapor for desorption, so the carbon dioxide gas recovery rate and concentration are limited due to the partial pressure of the carbon dioxide gas in the mixture, as will be explained in detail in the comparative examples below.

Technical Issue 2: Methods of Improving Recovery Concentration (Analysis of Previous Work)

Patent document 1 discloses the flow of a rotor-rotating energy-saving ultra-low dew-point dehumidifier. The rotor is divided into a second adsorption zone, a first adsorption zone, a second regeneration zone, a first regeneration zone, and a pre-cooling purge zone in order of the direction of rotor rotation. Process air is dehumidified as it passes through the honeycomb in the first adsorption zone. After dehumidification, the treated air is cooled because the heat of adsorption raises its temperature, and is further dehumidified to a very low dew point in the second adsorption zone before being supplied.

On the regeneration side, a portion of the outlet air from the second adsorption zone is introduced into the pre-cooling purge zone to cool the honeycomb immediately after regeneration while purging it with ultra-low dew-point air, and the honeycomb rotates and moves to the second adsorption zone. Since the purge exit air is heated by recovering heat from the honeycomb, it is further heated by a regeneration air heater and passes through the honeycomb in the first regeneration zone. The air that has passed through the first regeneration zone still has a low dew point and high enough temperature to be regenerated, so the air is heated again to pass through the honeycomb in the second regeneration zone and regenerated exhaust air. With this flow configuration, a single rotor unit can dehumidify the air to a very low dew point while saving energy. This method is devised to reduce regeneration energy consumption while increasing the removal rate of water vapor in the process air to the utmost limit, but it is impossible to increase the recovery concentration.

The flow disclosed in Patent Document 2 is for concentrating dilute gas and has an adsorption zone, a first desorption zone, a concentration zone, and a second desorption zone in the order of the direction of rotation of the rotor. Heated air, in which a portion of the process gas is heated by an air heater, is introduced into the first and second desorption zones. In the first desorption zone, the gas adsorbed in the adsorption zone is concentrated and desorbed. The primary concentrated gas leaving the first desorption zone is introduced into the concentration zone and reabsorbed. The honeycomb is then rotated to the second desorption zone, where it is concentrated and recovered at a high ratio by the introduction of the aforementioned desorption air. This method can only achieve a tenfold to twentyfold concentration and cannot achieve higher concentrations.

The flow disclosed in Patent Document 3 is also designed to concentrate dilute concentration gas as much as possible, and is equipped with an adsorption zone, a first desorption zone, a second desorption zone, a third desorption zone, and a purge zone in the direction of rotor rotation. A portion of the process gas is passed through the purge zone to cool the rotor, while the air passing through the purge zone is heated by heat recovery, and then heated through a heater to be introduced into the first, second, and third desorption zones. By rotating the rotor, the gas at the outlet of the first desorption zone, which has a low concentration in the early stage of desorption, and the gas at the outlet of the third zone, which has a low concentration near the end of desorption, are mixed back to the treatment inlet side to increase the adsorption concentration. In this flow, the concentrated gas is collected from the outlet of the second desorption zone, which has the highest concentration peak among the three desorption zones. This method also assumes a tenfold to twentyfold enrichment, and no further enrichment is possible.

In principle, it is not possible to separate and concentrate several hundred ppm to several percent carbon dioxide gas to a concentration of 50 percent to 100 percent in any of Patents 1, 2 and 3.

Technical Issue 3: Equipment Configuration to Achieve Low Cost and Adiabaticity

Compared to the heated gas used for regeneration in the conventional dry TSA method, saturated steam at nearly 100° C. has an energy density several hundred times higher. Therefore, a temperature drop of a few degrees causes a large amount of condensate and energy loss, so we investigated a method to ensure high thermal insulation while controlling cost increase.

In the conventional air treatment equipment manufacturing method, sheet metal is fabricated, welded and assembled, painted products, and sealed with caulking material to prevent leaks at overlapping parts of the sheet metal. Equipment such as rotors, heat exchange coils, heaters, and blowers are installed and wired, and insulation is applied where necessary. If heat resistance is required, glass fiber insulation is used. If dew condensation is to be prevented, styrene foam insulation plates are used. As described above, this involves a large number of man-hours and inevitably increases costs.

Another conventional technology is to use a heat insulation board made by sandwich bonding a styrene foam board or the like between two steel plates, assemble it into a box shape via a molded aluminum frame, and build a rotor, blower, or other equipment inside to reduce costs such as man-hours for heat insulation, etc. However, this is for medium to large equipment for air conditioning and cold heat, and for equipment that requires TSA operation, internal heat-resistant ducts and heat insulation measures must be taken, which also increases costs. However, this method is only for medium to large-sized equipment for air-conditioning air and cooling heat, and for equipment that requires TSA operation, internal heat-resistant ducts and insulation measures must be taken, which also increases costs.

Patent Document 14, JP H11-132522 relates to heat insulation and cost reduction of a heat exchange ventilation system. By combining and integrating a "heat exchange element structure," which incorporates a heat exchange element and is molded and integrated from styrene foam, an "exhaust fan side structure," which incorporates an exhaust fan and is molded and integrated from styrene foam, and an "air supply fan side structure," which incorporates an air supply fan and is molded and integrated from styrene foam The technology to realize a ventilator with high heat insulation and soundproofing is disclosed.

This technology is intended for quiet and low-cost heat exchanger ventilators for home use, and is superior in terms of insulation, quietness, productivity, and cost reduction, but it is suited high-volume production and not for small-volume production systems with design support for facility scale. Also, since it is a stationary total heat exchanger ventilation system, it can be handled with such materials and structures.

The wet TSA method carbon dioxide gas separation and concentration system, which is the objective of this proposal, requires high thermal insulation and heat resistance, has sliding seals for the rotating rotor, complex purging and flow paths, and uses saturated steam and more difficult.

SUMMARY

To further improve the performance of the wet TSA method, we considered raising the saturated vapor temperature to nearly 100° C. We also considered measures to prevent thermal and oxidative degradation of the sorbent due to oxygen brought into the desorption zone. Near 100° C. means close to the boiling point of water at atmospheric pressure plus the pressure drop of steam and gas in the device. The temperature can be positive or negative to 100° C., depending on atmospheric pressure and altitude.

At least in the order of the direction of rotation of the rotor, a rotor with carbon dioxide gas sorption capacity is rotated in a sealed casing each having a treatment gas zone, a recovery zone and a desorption zone. The recovery and desorption zones are formed in "stacked purge and recovery blocks" of highly insulated construction that do not produce condensate.

In the process gas zone, air and mixed gas containing carbon dioxide gas is introduced into the rotor, which is moistened with condensate, and carbon dioxide gas is sorbed while evaporating and cooling the condensate.

In the desorption zone, saturated steam of nearly 100° C. is introduced to desorb highly concentrated carbon dioxide gas by condensation heat of the steam and collected through the recovery zone. The carbon dioxide gas separation and concentration system is capable of supplying the process outlet air to air conditioning.

Various rotor type gas recovery concentrator flows have been proposed, but all of them recover the gas at the exit of the desorption zone, which is desorbed by the most energetic desorption gas.

The proposal differs, however, in that the desorption exit gas, which is desorbed by the most energetic saturated vapor, is passed through a recovery zone for heat recovery, cooling, and dehumidification. In other words, saturated vapor at nearly 100° C. is introduced into the desorption zone to desorb carbon dioxide gas from the honeycomb, and a mixture of carbon dioxide gas and saturated vapor at the exit is introduced into the recovery zone on the front side in the direction of rotation to recover the carbon dioxide gas is recovered by introducing and passing a mixture of carbon dioxide gas and saturated water vapor at the exit of the gas into the recovery zone on the front side of the rotation direction.

As a way to further improve the recovery rate, recovery concentration, and energy efficiency, we considered a device that combines a circulation purge zone before and after the recovery and desorption zones described above.

A rotor with carbon dioxide gas sorption capacity is stored and rotated in a casing having a treatment gas zone, a treatment gas purge zone, a recovery zone, a desorption zone, and a desorption gas purge zone, each sealed in the order of rotation direction at least. The treatment gas purge zone, recovery zone, desorption zone, and desorption gas purge zone are formed in a "stacked structure purge and recovery block" with a highly insulating structure that does not produce condensate.

In the process gas zone, mixed gas containing carbon dioxide gas is introduced into the rotor, which is moistened with condensate, and carbon dioxide gas is sorbed while evaporating and cooling the condensate.

The treatment gas purge zone and the desorption gas purge zone circulate. Saturated steam of nearly 100° C. is introduced into the desorption zone, and the condensation heat of the steam is used to desorb highly concentrated carbon dioxide gas, which is then recovered through the recovery zone. This is a carbon dioxide gas separation and concentration unit that allows air conditioning of the process outlet air.

Carbon dioxide gas separation and recovery is not a viable business by itself. Therefore, we considered a method that combines carbon dioxide gas recovery with the effective use of air with a low concentration of carbon dioxide gas after treatment.

A carbon dioxide gas separation and concentration unit capable of air conditioning the air exiting the process gas zone and recovering the carbon dioxide gas exiting the recovery zone, where the mixed gas containing carbon dioxide is air or conditioned air.

Based on the experimental results described below, we considered that a highly insulated structure is an absolute prerequisite for the high performance of the wet TSA carbon dioxide separation and concentration technology. This is because condensate leakage other than from the recovered gas means enormous heat loss.

Conventional air treatment equipment such as dehumidifiers and VOC concentrators are manufactured by welding and painting fabricated sheet metal parts, attaching and assembling blowers, rotors, sealing devices, heaters, and other components, and then insulating and electrically wiring them. Insufficient insulation causes performance degradation, energy loss, and malfunctions, resulting in increased processing man-hours and higher costs.

Wet TSA separation and concentration methods require significantly higher insulation than conventional products, since saturated vapor at nearly 100° C. has an enthalpy several hundred times higher than that of air or carbon dioxide gas at the same temperature. gas at the same temperature. In addition, the lower the temperature of saturated vapor from 100° C., the higher the rate of mixing of gases other than water vapor. Therefore, we considered that keeping the saturated vapor temperature as close to 100° C. as possible is a prerequisite for countermeasures against thermal and oxidative degradation and for high concentration recovery.

The wet TSA method carbon dioxide gas separation and concentration equipment has complex zones, as described above, and requires a high degree of insulation and resistance to moisture and heat to prevent condensation of vapor and heat loss in unnecessary areas. In addition, high sealing performance is required due to the large concentration difference between the raw gas and recovered gas. We studied methods to realize such equipment with high productivity, low cost, high heat insulation, and lightweight structure, and propose the "module board laminated unit structure," in which multiple foam module boards are laminated, assembled, and integrated with each device and flow path on foam boards selected according to the required characteristics of the required locations.

The "module board stacked unit structure" is completed as a carbon dioxide gas separation and concentration device or air conditioning device by processing installation spaces for components and gas distribution channels on multiple foam boards, assembling components such as rotors and drive units, and stacking and assembling each module board.

The "Rotor Cassette Module Board" incorporates a drive system including a honeycomb rotor, drive motor, and drive belt into a foam board.

The "Rotor end face module plate" incorporates a "stacked structure purge/retrieval block" composed of multiple heat-resistant foam rubber plates, etc., each with a space and connecting passageway for removal, recovery, purging, etc., There are two types, one for the front and the other for the rear, which hold the rotor shaft and support and seal both sides of the rotor.

The "airflow system module board" incorporates the process gas blower.

The carbon dioxide gas separator/concentrator capable of air-conditioning the process outlet air mentioned above, wherein the "rotor cassette module plate" is sandwiched between the front and rear "rotor end face module plates" and the "airflow system module plate" is laminated and assembled together.

The most important part of the "Rotor Cassette Module Board" is the "Stacked Structure Purge/Recovery Block," a fan-shaped part that constitutes the zones for recovery, desorption, purging, etc. It must also have elasticity, sliding properties, abrasion resistance, heat resistance, and water resistance to ensure sealing performance.

The block structure includes a fan-shaped sheet with and without each zone space stacked on top of each other.

The sliding surface in contact with the rotor end face is made into a block by laminating and bonding a heat-resistant and abrasion-resistant sliding sheet, a multiple foam rubber sheet layer or foam plate layer with a continuous passage between each zone in the lower layer, and a heat-insulating plate without a zone space in the lowest layer. In addition, a "laminated structure purge and recovery block" is provided with a vapor introduction section and a desorption gas collection section on the periphery or bottom surface.

The carbon dioxide gas separation and concentration unit may incorporate the "laminated structure purge and recovery block" and the "laminated structure purge and recovery block", wherein the process outlet air can be supplied by air conditioning.

Effect of Simultaneous Solution of Technical Problem 1 and Problem 2

The newly proposed flow has a treated gas zone, a recovery zone, and a desorption zone in the order of the rotational direction of the rotor, and saturated steam of nearly 100° C. is introduced into the desorption zone to desorb carbon dioxide gas sorbed on the honeycomb by the condensation heat of water vapor. The carbon dioxide gas sorbed on the honeycomb is desorbed by introducing saturated steam of nearly 100° C. into the desorption zone, and the gas is introduced and passed through the recovery zone at the front in the direction of rotation to recover the carbon dioxide gas.

This flow, combined with the effect that air brought into the recovery zone by the rotor rotation is purged and recovered, preventing oxygen from mixing with the hottest desorption zone, suppresses oxidative deterioration of the sorbent, and allows the use of nearly 100° C. saturated steam regular basis. In addition, the energy-saving effect of preheating and heat recovery of honeycomb before desorption in the recovery zone and the effect of lowering the gas temperature and vapor content from the recovered gas side also reduce the cooling load for the separation of carbon dioxide gas and water vapor after recovery.

As a way to further increase the recovery rate, recovery concentration, and energy efficiency, we considered a method of combining a circulation purge zone before and after the aforementioned recovery and desorption zones.

As the rotor rotates from the process gas zone to the process gas purge zone, the process gas in the honeycomb void is purged with gas from the desorption gas purge zone and extruded. The extruded gas is circulated into the desorption gas purge zone to displace and extrude the desorbed gas in the honeycomb void.

The extruded desorption gas is introduced into the process gas purge zone by a circulation path.

The above circulating purge principle has the effect of mutually replacing the gases in the honeycomb voids in the purge zones combined before and after the carbon dioxide gas recovery and desorption zones, thereby improving the recovery rate and concentration and increasing energy efficiency.

Effects of Solving Problem 3 of Conventional Technology

The "module board laminated unit structure" is constructed by selecting foam boards made of materials that match the required characteristics of the required part, cutting out the required part, assembling the component parts into a module, and laminating the module boards to integrate the entire device. The system can be easily assembled to ensure sufficient heat insulation, and can be used for both low-volume and mass production, enabling significant cost reductions.

The use of a "stacked structure Purge/Recovery block" in the desorption, retrieval, and purging functions allows for complex multiple zones with high precision, low-friction sliding properties, good sealing effect, and good tracking performance, while requiring no complicated adjustments, ensuring heat resistance, heat insulation, and durability, and reducing costs.

BRIEF DESCRIPTION OF THE DRAWINGS

These and/or the other aspects and advantages will become apparent and more readily appreciated from the following description of the embodiments, taken in conjunction with the accompanying drawings.

Figure 1:
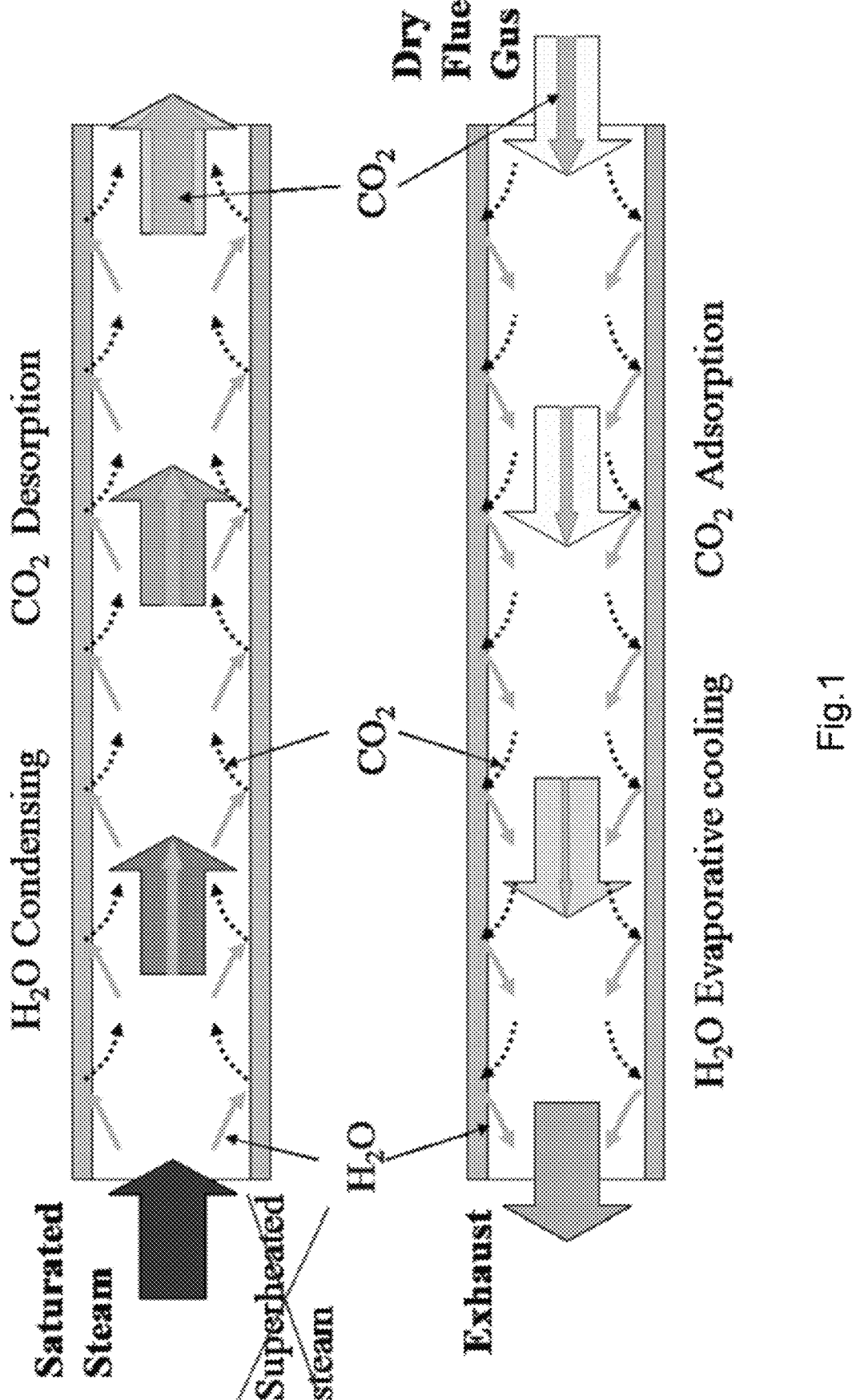
FIG. 1 Illustrates the principle of the wet TSA method of sorption and desorption.

DETAILED DESCRIPTION OF THE PREFERRED EMBODIMENTS Reference will now be made in detail to the embodiments, examples of which are illustrated in the accompanying drawings, wherein like reference numerals refer to the like elements throughout. The embodiments are described below to explain the present invention by referring to the figures.

The following is a detailed description of an embodiment in which the present invention is applied, based on the drawings. In each drawing, parts and materials with the same symbols are of the same or similar configuration, and duplicate explanations of them shall be omitted as appropriate. In addition, in each drawing, parts, etc. unnecessary for explanation are omitted from the figures as appropriate.
Flow for High Performance To improve performance, we considered raising the saturated vapor temperature to nearly 100° C., and considered countermeasures against thermal and oxidative deterioration of the sorbent material caused by oxygen brought into the desorption zone.

Figure 2:
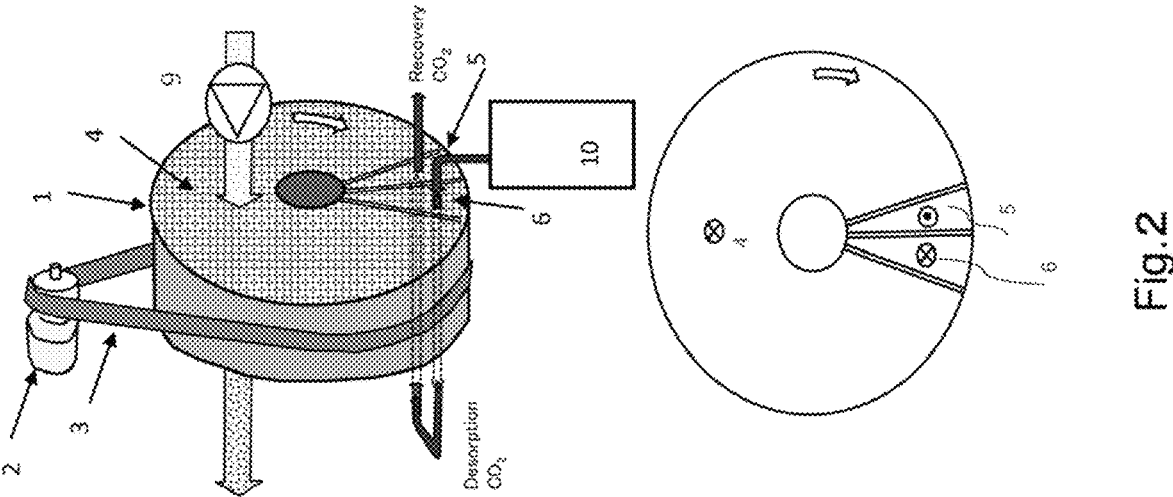
FIG. 2 Shows the basic flow diagram of the first embodiment of the carbon dioxide gas separator/concentrator capable of supplying air-conditioned air.

The first embodiment of the carbon dioxide gas separation and concentration device capable of supplying air conditioning contains and rotates a rotor with carbon dioxide gas sorption capacity inside a sealed casing. The basic flow is as shown in FIG. 2, where the rotor 1 (carbon dioxide sorption honeycomb rotor) has, at least in order of direction of rotation, a treatment gas zone 4, a recovery zone 5, and a desorption zone 6. Reference numerals 2, 3 and 9 represent a rotor drive motor, a rotor drive belt and a processing gas fan, respectively.

In the process gas zone 4, the rotor is moist. With the passage of air containing carbon dioxide gas, the carbon dioxide gas is sorbed while the moisture evaporates. Saturated vapour is introduced into the desorption zone 6 and the heat of condensation of the vapour causes the high concentration of carbon dioxide gas to be desorbed, and the exit gas is collected by passing through the recovery zone 5.

This flow minimizes the risk of oxygen contamination, which prevents oxidative degradation of the sorbent material in the highest-temperature desorption zone and enables regular use of saturated steam at around 100° C., thereby improving performance. In addition, the recovery zone 5 has many advantages, such as the energy efficiency improvement effect of preheating and heat recovery of honeycomb prior to desorption, and from the recovered gas side, the cooling load for vapor separation of recovered gas can also be reduced because the temperature and vapor content of carbon dioxide gas are reduced. Recovery zone 5 can be expanded to two or three stages by folding it back to the front side of the rotor rotation to further improve energy efficiency.

Figure 3:
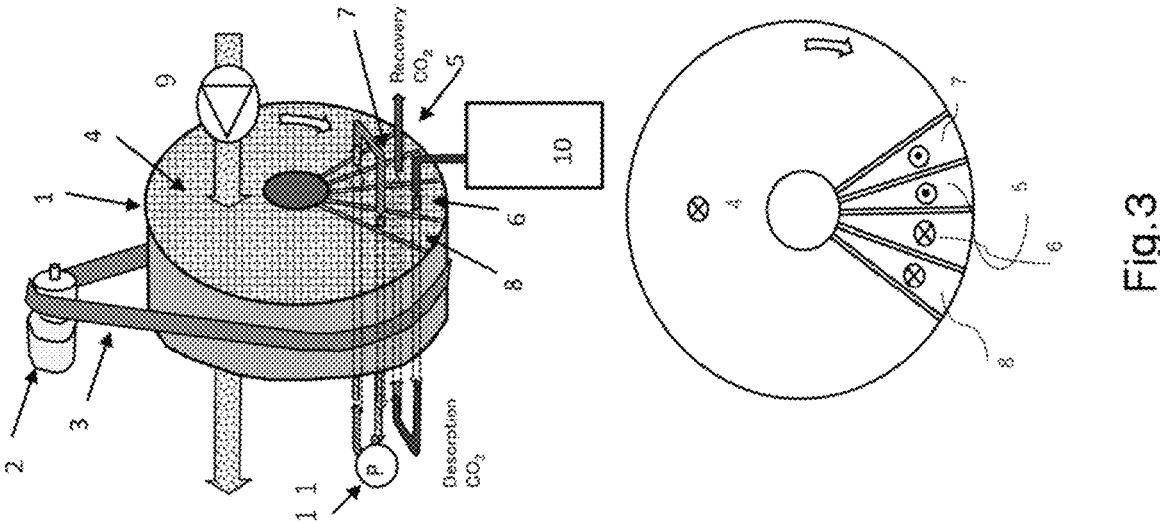
FIG. 3 Shows a basic flow diagram of a carbon dioxide gas separator/concentrator capable of supplying air conditioning of the second embodiment.

A second embodiment of the device, FIG. 3, combines a circulation purge zone before and after the aforementioned recovery and desorption zones as a flow to further improve the recovery rate, recovery concentration, and energy efficiency. As shown in FIG. 3, the second embodiment, a carbon dioxide gas separation and concentration device capable of supplying air conditioning, rotates a rotor 1 with carbon dioxide gas sorption capacity in a casing with a seal. The zone configuration includes of, at least in the order of the direction of rotation, a treatment gas zone 4, a treatment gas purge zone 7, a recovery zone 5, a desorption zone 6, a desorption gas purge zone 8 The system is an air-conditioned carbon dioxide gas separation and concentration system in which the treatment gas purge zone 7 and the desorption gas purge zone 8 are purged in circulation. The circulating purge gas is circulated by a diaphragm or other constant volume pump.

The oxygen-containing gases brought into the honeycomb voids from the process gas zone by the rotor rotation are exhausted in the process gas purge zone 7, and the exhaust is introduced into the desorption gas purge zone 8 to push out and replace the desorbed gases in the honeycomb voids. The displaced desorption gas is circulated back into the process gas purge zone 7. By mutually replacing the gases in the honeycomb voids before and after the recovery and desorption zones as described above, the recovery rate, recovery concentration, and energy efficiency are improved.

'Stacked structure purge and recovery blocks' for complex flow configurations at low cost and high accuracy.

In various conventional separation and concentration units, the recovery, desorption and purge zones are welded sheet metal or, in smaller units, a chamber structure made of cast metal. Each chamber requires insulation and the gas flow paths are configured with duct connections, making complex flow configurations impossible. Therefore, a method was considered to implement complex zone and flow configurations as simply, highly insulated and inexpensively as possible. This is the 'stacked purge and recovery block' structure, which integrates zone configurations such as recovery, desorption and purging.

Figures 7, 8:
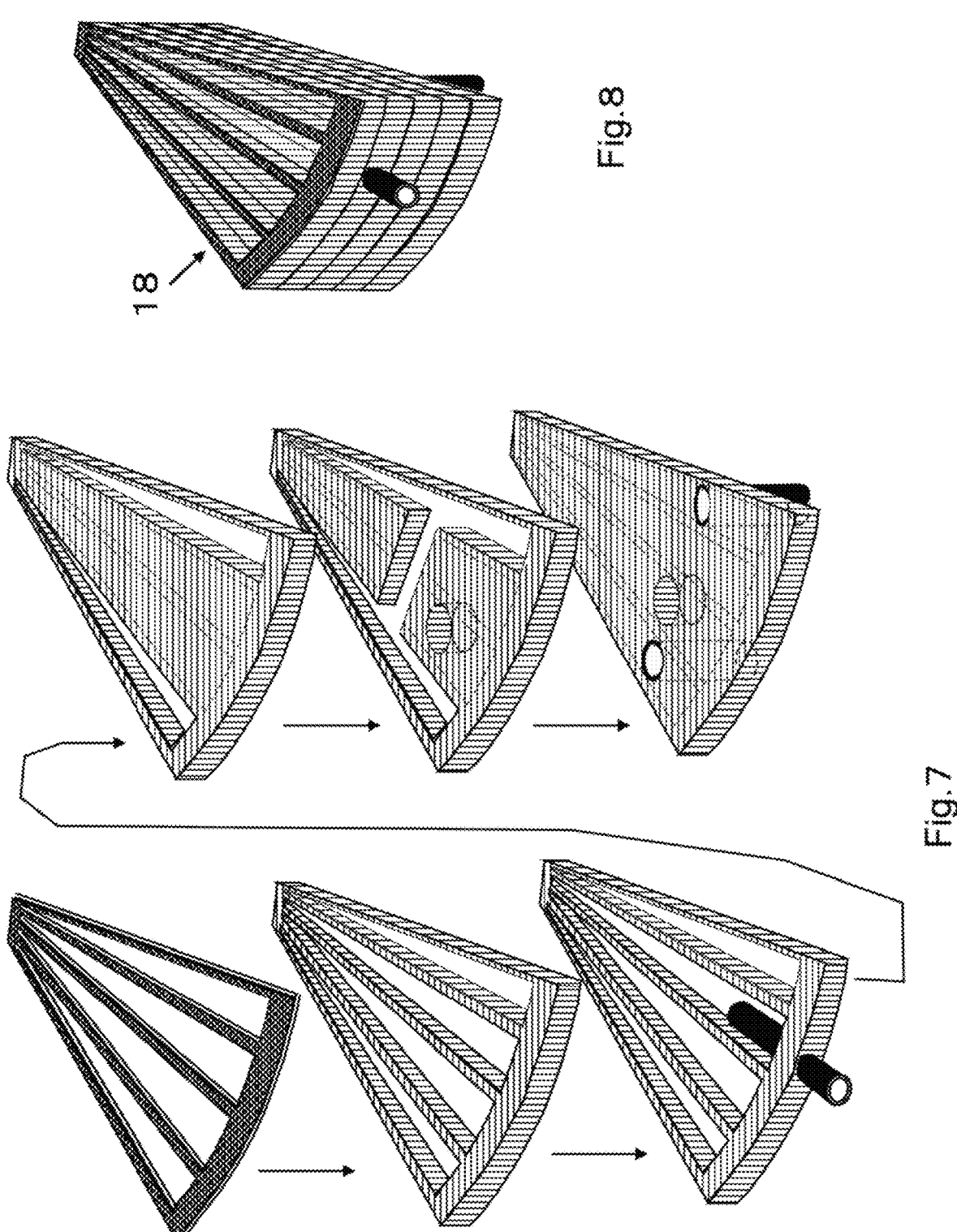
FIG. 7 Part view of the "stacked purge and recovery block" of the air-conditioning-supplyable carbon dioxide gas separation and concentration device of the second embodiment, before assembly.
FIG. 8 Post-assembly view of the "stacked purge and recovery block" of the second embodiment of the air-conditioning-supplyable carbon dioxide gas separation and concentration device.

'Laminated purge and recovery blocks' are required to have elasticity, heat resistance and sealing properties. The material needs to be selected according to the required characteristics, such as heat resistance, the foam magnification and the material of the rubber sheet. For example, as shown in FIG. 7, a pre-assembly component diagram of the 'laminated purge and recovery block' of the carbon dioxide separation and concentration device and or air conditioning device of the second embodiment, 3-4 mm or 5 mm or more depending on the size of the device to form the zone space and communication channels of each layer. Silicone rubber foam sheets are used. Zone spaces and communication channels are constructed in each layer as shown in FIG. 7. This process can be mass-produced using existing methods such as Thomson cutting, laser cutting and water-jet cutting. In the future, a 3D printer could also be used to develop a manufacturing method to build each layer in layers.

The part that contacts the rotor end face and slides is laminated with a sheet with low sliding friction, for example, a fluoroplastic-based sheet. A soft foam rubber layer with excellent flexibility tracking can be selected for the layer immediately below it, and a hard foam rubber plate can be selected for the bottom layer. If rigidity is required for scale-up, the lower layer should be composed of a harder foam rubber board or resin-based foam board. If necessary, a laser-cut metal or other plate can easily be inserted between the two layers to reinforce them. By laminating and bonding these foam rubber plates of various layers as shown in FIG. 8, a "laminated structure purge and recovery block" 18 can be made, comprising each zone and necessary connecting passageways. Thus, while having complex multiple zones, the block has high precision, low-friction sliding properties, good sealing effect, and good tracking performance, does not require complicated adjustments, ensures heat resistance, heat insulation, and durability, and keeps costs low.

Figure 5:
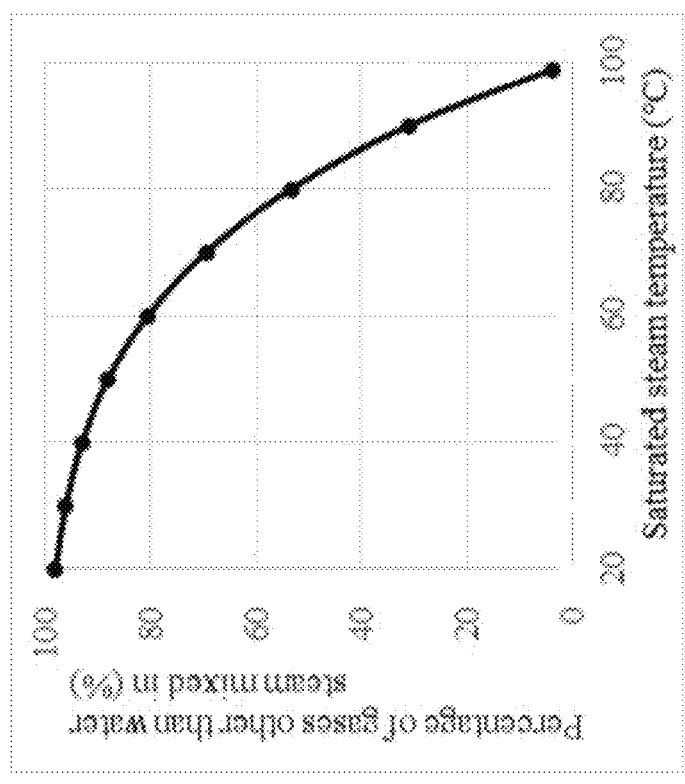
FIG. 5 Illustrates the mixing rate of gases other than steam according to the temperature of saturated steam.
Figure 4:
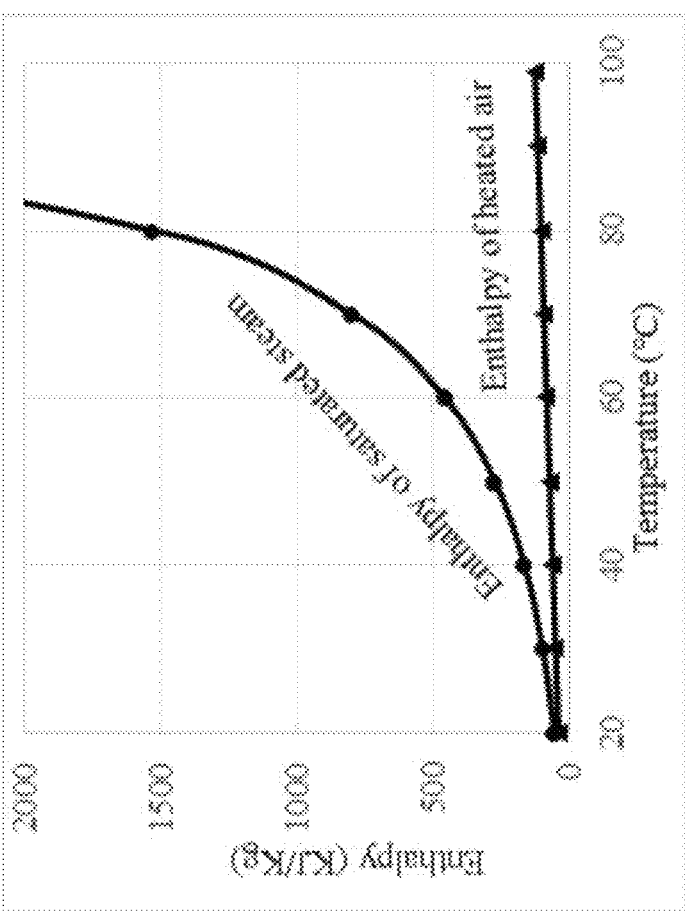
FIG. 4 Shows a comparison of the enthalpy of saturated steam and heated air at different temperatures.

Since the "stacked structure purge and recovery block" can be easily deviceized at low cost even with a complex flow configuration, a second recovery zone can be added on the front side in the rotational direction by folding back the recovery zone 5, and the two-stage gas heat recovery pre-cooling effect and the residual heat of the honeycomb can be used to further improve energy efficiency.
Module Plate Stacked Unit Structure," a Highly Insulated Structure that can be Realized at Low Cost The wet TSA separation and concentration method requires higher thermal insulation than conventional products. The reason for this is that saturated vapor at around 100° C. has an enthalpy several hundred times higher than that of air or carbon dioxide gas at the same temperature, as shown in FIG. 4. Furthermore, FIG. 5 shows that saturated vapor at 100° C. is 100% water vapor, but at 8 0° C., the mixing ratio of gases other than water vapor is 50%. From this, we considered that keeping the saturated steam temperature as close to 100° C. as possible is a prerequisite for countermeasures against thermal and oxidative degradation and for high concentration recovery. FIG. 4 also shows that a drop of only a few degrees from the saturated vapor temperature of 100° C. causes a huge energy loss, indicating that high thermal insulation is necessary. Therefore, we considered a "module plate laminated unit structure" that can achieve high thermal insulation at low cost.

The "module board stacked unit structure" is completed as a carbon dioxide gas separation and concentration device by processing and configuring the installation space and gas distribution channels for each component on multiple foam boards, assembling the components, and stacking and assembling each module board.

Figure 6:
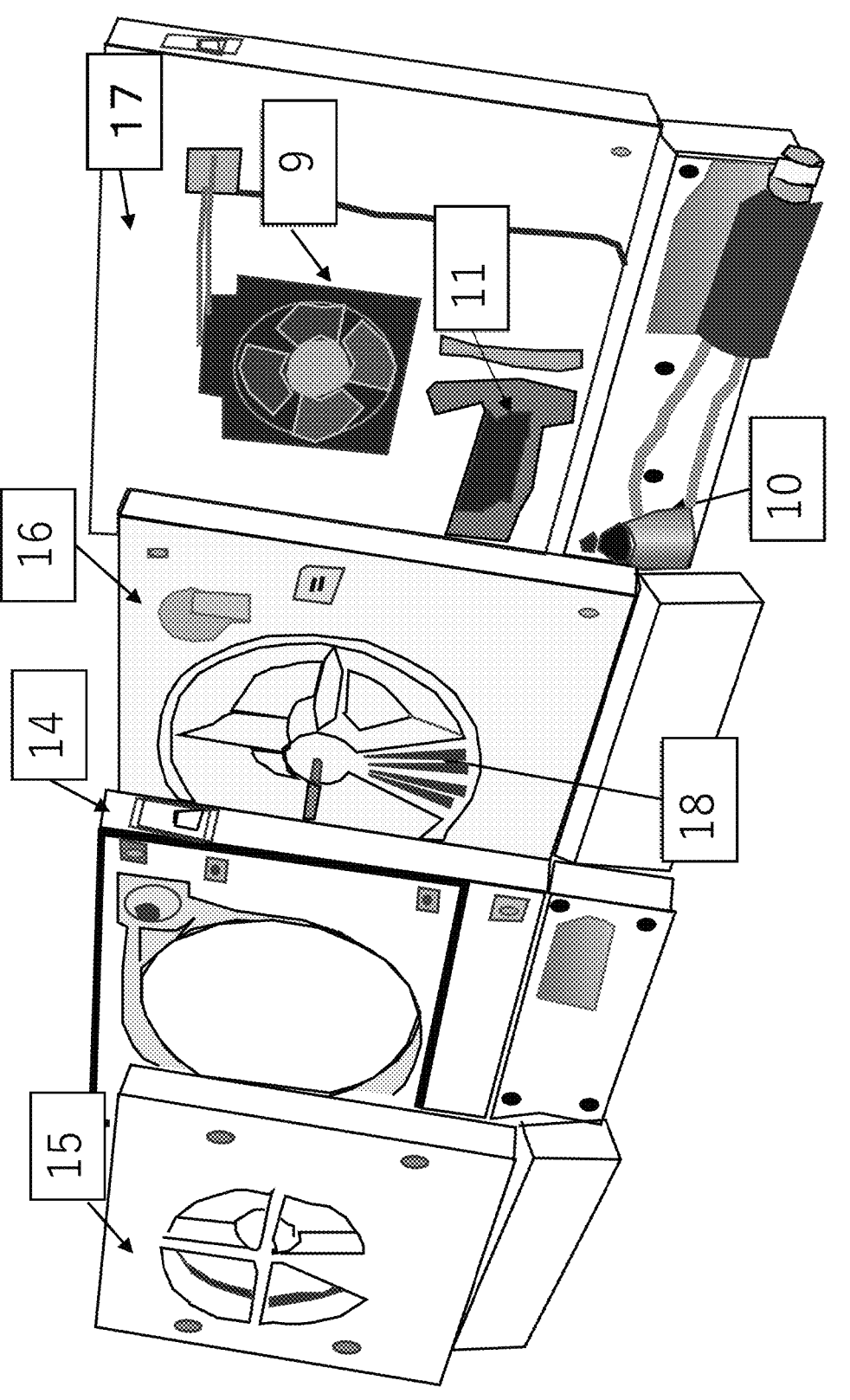
FIG. 6. Shows an exploded view of the foam module plate stacking unit of the second embodiment of the air-conditioning-supplyable carbon dioxide gas separation and concentration system prior to assembly.

FIG. 6 shows a group of boards before assembly. The "Rotor Cassette Module B Board" 14 incorporates the rotor 1 with carbon dioxide gas sorption function and the drive system in a foam board.

The front A board 15 and the rear C board 16 of the "Rotor End Faces Module A and C Boards" support and seal the rotor shaft and both end faces.

The A-board 15 and C-board 16 incorporate a "laminated structure purge and recovery block," 18 which is laminated with a plurality of heat-resistant foam rubber plates, etc. to form a flow channel space, and laminated with a glass-filled fluororesin-based sliding material on the sliding surfaces are incorporated in each of them. The A, B, C, and D boards are laminated and assembled into a single unit.

The small boiler and circulating pump are incorporated in any of the module plates by configuring the space. It is preferable to set the "stacked purge and recovery block" 18 slightly protruding from the sliding contact surface of the rotor end face of the "rotor end face module plate" by the amount of pressure contact, as this will improve the zone block's ability to follow the rotor end face and seal it. Maintenance, replacement and adjustment are also easier.

Figure 9:
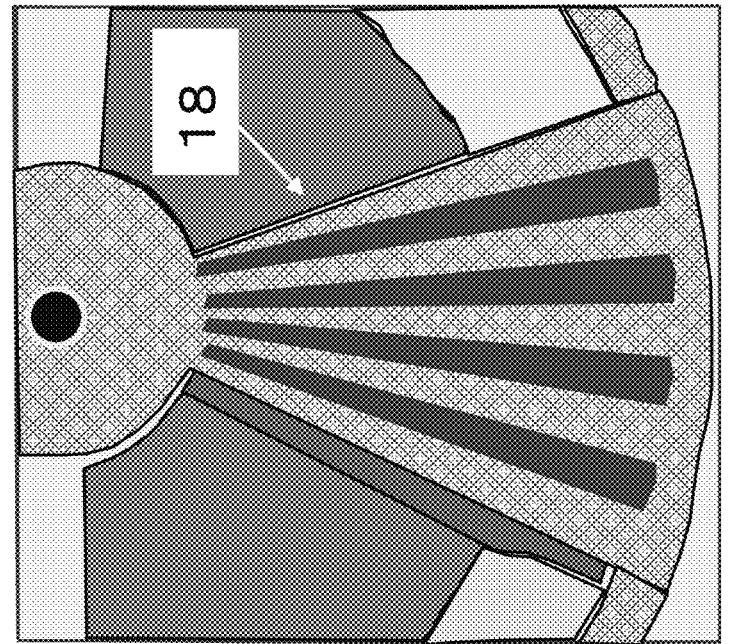
FIG. 9 Shows a photograph of the "stacked purge and recovery block" of the second embodiment of the air-conditioned carbon dioxide gas separator/concentrator assembled to the rotor end face module plate.

FIG. 9 is a photograph of the "stacked purge and recovery block" of the second embodiment incorporated into the "rotor end face module block" 15 and 16. Each module plate is stacked and integrated in the order of 15, 14, 16, and 17 to complete the FIG. 10.

This structure enables a device that combines low cost, high thermal insulation, flexible sealing, and energy efficiency. It is within the scope of design to laminate or cover the exterior of the stacked unit with colored steel plates or other materials to make it portable and durable for outdoor use, and for design purposes.

As described above, this device is constructed as a module by selecting heat-insulating foam boards made of materials that match the required characteristics of the required locations, cutting out the equipment installation locations and flow paths, assembling the components, and stacking the module boards to integrate the entire device. The simple assembly also ensures sufficient heat insulation, and allows for small-quantity as well as mass production, resulting in significant cost reductions.

The proposal will be explained using a honeycomb rotor apparatus. For example, a rotor 1 with a honeycomb made of inorganic fiber sheet or the like loaded with an adsorbent having amine groups is used, and in the order of the direction of rotation of the rotor, the rotor passes through a treatment gas zone 4, a treatment gas purge zone 7, a recovery zone 5, a desorption zone 6, a desorption gas purge zone 8 and back to the treatment gas zone 4, as shown in FIG. 3 FIG. 3. In a simpler configuration, the flow can also be as shown in the previously mentioned FIG. 2, where each gas purge zone 7 and 8 are omitted. In addition to honeycomb rotors, granular adsorbent-filled rotors or adsorbents made of laminated sheets of granular adsorbent dispersed and bonded together can be used, and the rotor can be a cylinder type instead of a disc type.

FIG. 3 illustrates an example of recovering carbon dioxide gas from outdoor air or air-conditioned air.

Since the process gas is air or air-conditioned air, no particular pretreatment is required. For example, outside air is passed through the process gas zone 4, carbon dioxide gas is sorbed onto the honeycomb rotor 1, and the air is exhausted by a blower. This exhaust air has a lower concentration of carbon dioxide gas than the outdoor air, so it can be used for indoor air conditioning to reduce the ventilation load and improve intellectual productivity. The rotor that has sorbed carbon dioxide gas rotates to the process gas purge zone 7, is purged with gas from the desorption gas purge zone 8, and rotates to the next recovery zone 5. In the recovery zone 5, the outlet gas from the desorption zone 6 is introduced, and the gas that passes through is recovered as highly concentrated carbon dioxide gas.

The exit gas from the desorption zone 6 is a mixture of highly concentrated carbon dioxide gas and saturated vapor, which is passed through the recovery zone 5 for recovery. This further reduces the risk of oxygen contamination into the desorption zone 6, and the honeycomb is preheated by the passing gas prior to desorption, which has a heat recovery effect, and from the perspective of the recovered gas side, is pre-cooled, reducing the steam cooling and separation energy load in the subsequent process.

When the honeycomb rotates into the desorption zone 6, saturated vapour of nearly 100° C. is introduced. The condensation heat of the vapour causes the carbon dioxide gas sorbed on the honeycomb to be desorbed and the vapour condenses at the same time. Since the mixed oxygen is removed in the recovery zone 5, thermal oxidative degradation of the sorbent is suppressed even when saturated vapour of nearly 100° C. is introduced.

The honeycomb rotates and moves from the desorption zone 6 to the desorption gas purge zone 8, where the mixture of desorption gas and saturated vapor contained in the honeycomb voids is purged. The purge gas is the gas that was purged and circulated in the process gas purge zone 7 described above. The gas purged in the desorption gas purge zone 8 circulates back to the aforementioned processing gas purge zone 7.

The circulating gas purge zones 7 and 8 can be omitted as shown in FIG. 2, in which case air from the process gas zone is mixed with the recovered gas, reducing the carbon dioxide concentration, but this is not a problem when the gas is reused in a plant factory or the like.

In the absence of the circulating gas purge zones 7 and 8, the honeycomb that has been desorbed of carbon dioxide gas next rotates and moves to the process gas zone 4. Although the honeycomb is still hot immediately after moving, its surface is covered with condensate, so it does not come into direct contact with oxygenated air, and it is immediately cooled by the latent heat of evaporation of the condensate to avoid thermal oxidation degradation. The rotor cooled by the latent heat of evaporation starts sorption of carbon dioxide gas, and the heat of sorption is cooled and removed by the latent heat of evaporation of the condensate, so the temperature rise is suppressed and efficient sorption proceeds. In this way, the wet TSA method can effectively separate and concentrate carbon dioxide gas by exchanging the heat of sorption of carbon dioxide gas and vaporization heat of water during sorption and exchanging the heat of sorption of carbon dioxide gas and condensation heat of water vapor during desorption.

Figure 10:
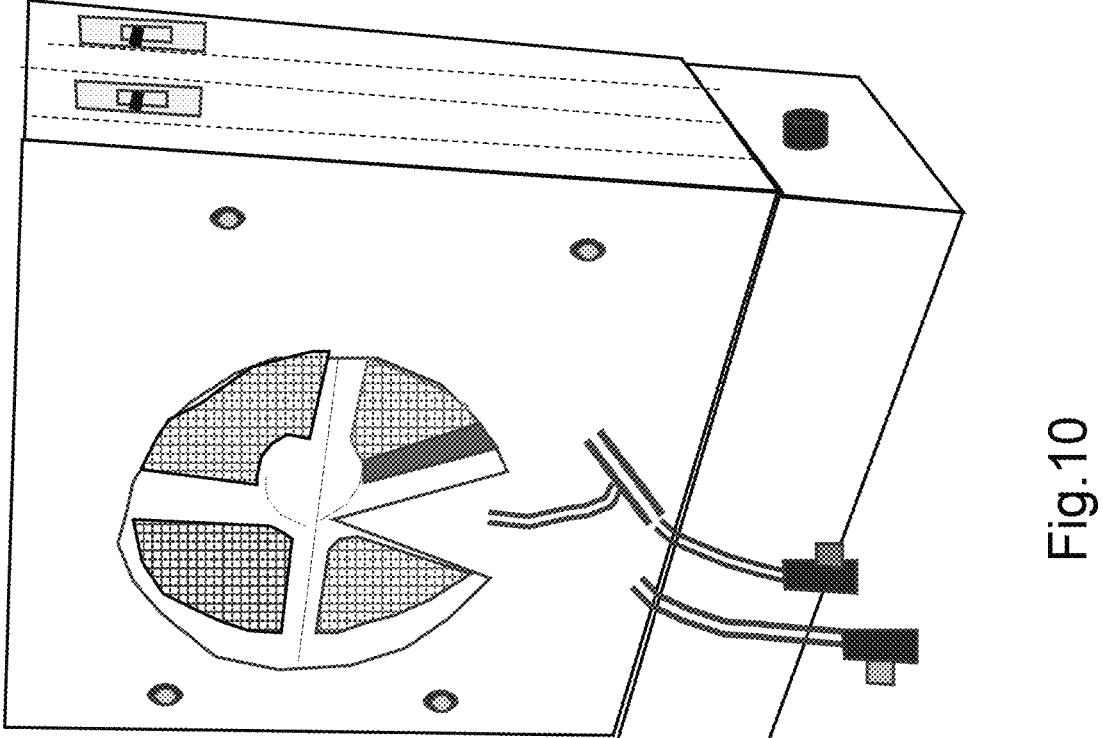
FIG. 10 Photograph of a prototype of the carbon dioxide separation/concentrator prototype, based on the "foam module plate stacked unit structure" of the air-conditioned carbon dioxide gas separation and concentration unit of the second embodiment.
Figure 12:
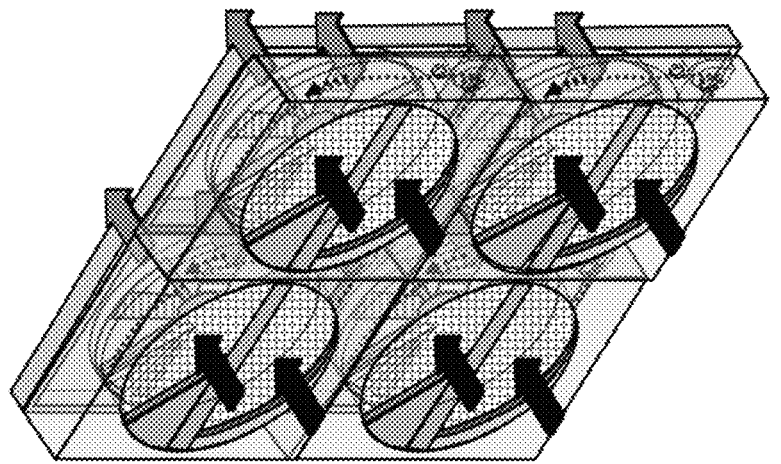
FIG. 12 Shows a conceptual diagram of a large-scale carbon dioxide separation, recovery, and concentration facility including of a group of medium-sized units of the air-conditioned carbon dioxide gas separation and concentration equipment of the second embodiment.
Figure 11:
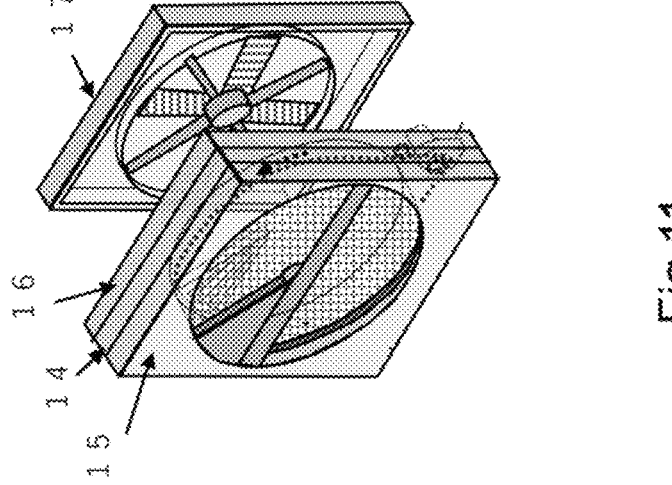
FIG. 11 Shows a conceptual diagram of a medium-sized scale-up of an air-conditioned carbon dioxide gas separation and concentration unit of the second embodiment.

For a medium-sized unit, FIG. 10 can be scaled up to realize a medium-sized unit that also integrates air blowing and desorption/retrieval functions, as shown in FIG. 11. For larger units, it is easy to combine multiple units as shown in FIG. 12 due to their lightweight characteristics.

When recovering carbon dioxide gas from flue gas, etc., the flue gas is hot and humid and contains polluting gases such as sulfur oxides, nitrogen oxides, dust, etc. Therefore, pre-treatment equipment such as denitration equipment, wet scrubbers, desulfurization equipment, and fabric filters must be installed to remove harmful gases and dust. In addition, because of the high temperature and humidity, the system must be cooled and dehumidified.

In the zeolite system, the inlet gas must be dehumidified to minus dew point temperature, but in the wet TSA method, the temperature and humidity of the outside air are sufficient. There is also a method of reducing the temperature and humidity by total heat exchange with outdoor air in a rotating total heat exchanger as disclosed in Patent Document 9, which increases running costs only slightly and lowers initial costs.

Background of the Breakthrough Study

Zeolite-based systems with high desorption temperatures cannot be used for the separation and concentration of carbon dioxide gas using low-temperature waste heat. Amine systems are promising, but they are susceptible to thermal and oxidative degradation, which limits the desorption temperature. A solution is presented in Patents 11 and 12. However, the method of purging with inert gas is costly in terms of purge gas and purge gas supply facilities, and there is the problem of reduced recovery concentration due to contamination with inert gas.

A rotary type that uses a vacuum pump to remove gases including oxygen has also been proposed in Patent Document 13. However, there are many difficult issues related to the strength of the equipment, the initial and running costs of the vacuum pump, the seal structure for switching between atmospheric pressure and vacuum, scale-up, and cost reduction.

Figure 13:
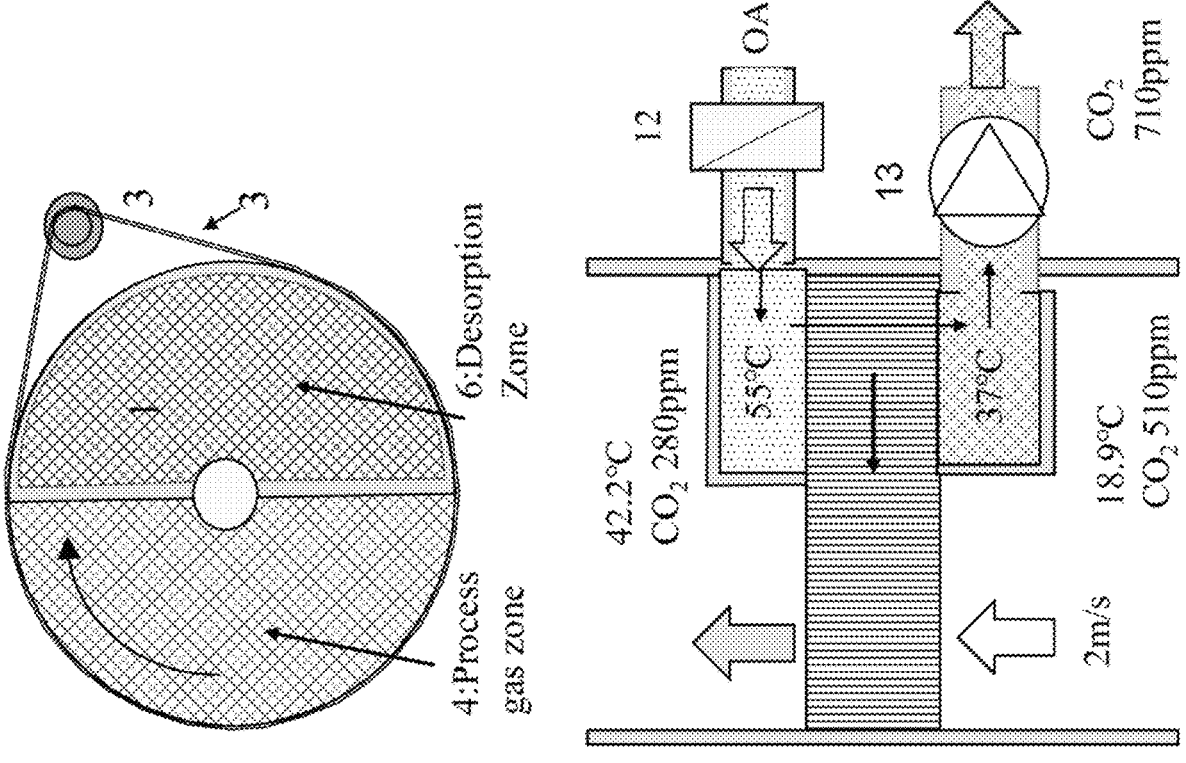
FIG. 13 Shows a schematic illustration of the dry TSA method experiment in Comparative Example 1.

Comparison Example 1 FIG. 13 shows an example of a test for atmospheric carbon dioxide gas separation and recovery using the conventional dry TSA method.

The rotor is made of porous glass fiber paper, processed into a corrugated paper with a pitch of 3.0 mm and a height of 2.0 mm, and wound the rotor.

The rotor is then coated with a mixture of amine-based weakly basic ion exchange resin fine powder with a particle size distribution of 0.02 to 0.1 mm and a heat-resistant, water-resistant binder. After drying, the rotor is finished into a rotor with an outer diameter of 200 mm×200 mm width. The honeycomb rotors contained 50% by weight of the above fine powder and had a bulk density of 150 kg/m3.

The carbon dioxide gas concentration analyzer is non-dispersive infrared (NDIR) and can measure concentrations from 0 to 10000 ppm.

The treatment: desorption zone ratio and the flow rate ratio through the zone are 1:1, and the air velocity through the treatment gas is 2 m/S. Desorption side is heated to 55° C. and introduced into the desorption zone.

This temperature is intended to avoid thermal oxidative degradation of the ion exchange resin, but experimental results show that the resin degrades even under these conditions.

In the dry TSA method, the treated air at 18.9° C. at the inlet increased to 42.2° C. at the outlet. The carbon dioxide gas recovery rate was 45%. The carbon dioxide gas concentration on the recovery side was 710 ppm. The low-temperature dry TSA method requires a large amount of desorption air to cover the amount of desorption energy by air volume, making high concentration impossible.

Since the process gas is ambient air, the concentration of carbon dioxide gas is low, and the temperature increase $\Delta t = 23.3°$ C. due to the passage of the process gas zone is thought to be mainly due to the heat of adsorption of water vapor.

The carbon dioxide gas recovery rate was 45%, but such a removal rate is not possible when the process gas has a high carbon dioxide gas concentration of around 10%, such as flue gas, because of the enormous amount of carbon dioxide gas sorption heat that is generated.

As in the case of the patent document 4, the recovery rate cannot be improved unless the treated gas is circulated repeatedly while being cooled, and this is impossible with a desorption temperature of about 100° C.

Therefore, the wet TSA method has been developed as a breakthrough technology. As shown in the upper figure of FIG. 1, saturated vapor is introduced in the desorption zone, and carbon dioxide is desorbed by the condensation heat of the vapor, and the honeycomb, moistened with condensed water, rotates and moves to the process gas zone. When carbon dioxide gas is sorbed onto honeycomb by passing carbon dioxide-containing gas through the process gas zone, the sorbent and feed gas rise in temperature due to the sorption heat of carbon dioxide gas and water vapor in the dry TSA method, and the carbon dioxide gas sorption decreases. In the wet TSA method, the sorption heat generated by the sorption of carbon dioxide gas is removed by evaporative cooling of condensate on the honeycomb surface, which proceeds simultaneously, as shown in the FIG. 1 below. This suppresses the temperature rise of the honeycomb and the feed gas, enabling highly efficient carbon dioxide gas sorption.

Since saturated steam at nearly 100° C. has an enthalpy more than 100 times greater than that of heated air or carbon dioxide gas at the same 100° C., there is no need to circulate carbon dioxide gas while reheating it many times in order to desorb it as in Patent Document 1.

In addition, since the introduction volume of saturated vapor, which has a huge heat capacity, is small, the desorption zone is small, and the rotor can also be downsized.

The saturated vapor introduced into the desorption zone is cooled by the heat consumed in heating the honeycomb and desorbing the carbon dioxide gas, and condenses on the surface of the honeycomb and sorbent material.

The honeycomb and sorbent are wet with condensate from the desorption zone immediately after moving to the treated gas zone, but when the treated gas flows in, they are strongly cooled by the evaporative cooling phenomenon of water, and carbon dioxide gas sorption begins. To take advantage of the evaporative cooling effect of the process gas, it is desirable to cool and dehumidify the process gas, but it is not necessary to dehumidify it to the negative dew point as in the case of using synthetic zeolite; the temperature and humidity range of the outside air is sufficient.

In the treated gas zone of the wet TSA method, the heat of carbon dioxide sorption is effectively cooled by the vaporization cooling phenomenon of water condensed and adhered to the honeycomb, and high sorption performance can be maintained. The latent heat of vaporization of carbon dioxide gas is 369.9 kJ/kg, while the latent heat of vaporization of water is 2500 kJ/kg. It is calculated that 1 kg of evaporation on the honeycomb can trade off the sorption heat equivalent to about 4-5 kg of carbon dioxide gas.

Furthermore, it has the effect of improving durability. Amine-based carbon dioxide sorbents and amine-based ion exchange resins can withstand temperatures up to 100° C. in the absence of oxygen. However, they deteriorate significantly in dry conditions in air, even at 40° C. Ion exchange resins are more durable in a hydrated state, and the same is thought to be true for other amine sorbents. In the method, durability is also thought to be improved when the entire process is operated in a wet, hydrated state.

The temperature rise in the sorption zone is kept low by the evaporative cooling phenomenon of condensate. The temperature in the desorption zone is 60 to 100° C., but there is almost no oxygen due mainly to the presence of carbon dioxide gas and saturated vapor. Immediately after rotating to processing zone 4, the temperature is high, but the surface is covered with condensate and direct contact with oxygen is avoided. The condensate evaporates and cools quickly, improving durability.

In the wet TSA method of Document 9, the oxygen concentration is suppressed by mixing saturated vapor while circulating the desorbed carbon dioxide gas in the desorption zone, and the desorption temperature is also suppressed to suppress thermal oxidative degradation.

For example, in the case of weakly basic ion exchange resins, which are sometimes considered for carbon dioxide sorption, it is known that the hydration state is more stable than the dry state, and it is thought that the hydration state is more stable for other amine sorbents, and experiments have confirmed this trend. However, as explained in Comparative Example 2, the partial pressure of carbon dioxide gas in the desorption circuit is relatively high and the desorption temperature is about 80° C., so the recovery concentration is limited to a few percent, and further breakthroughs are needed to improve the recovery concentration.

Figure 14:
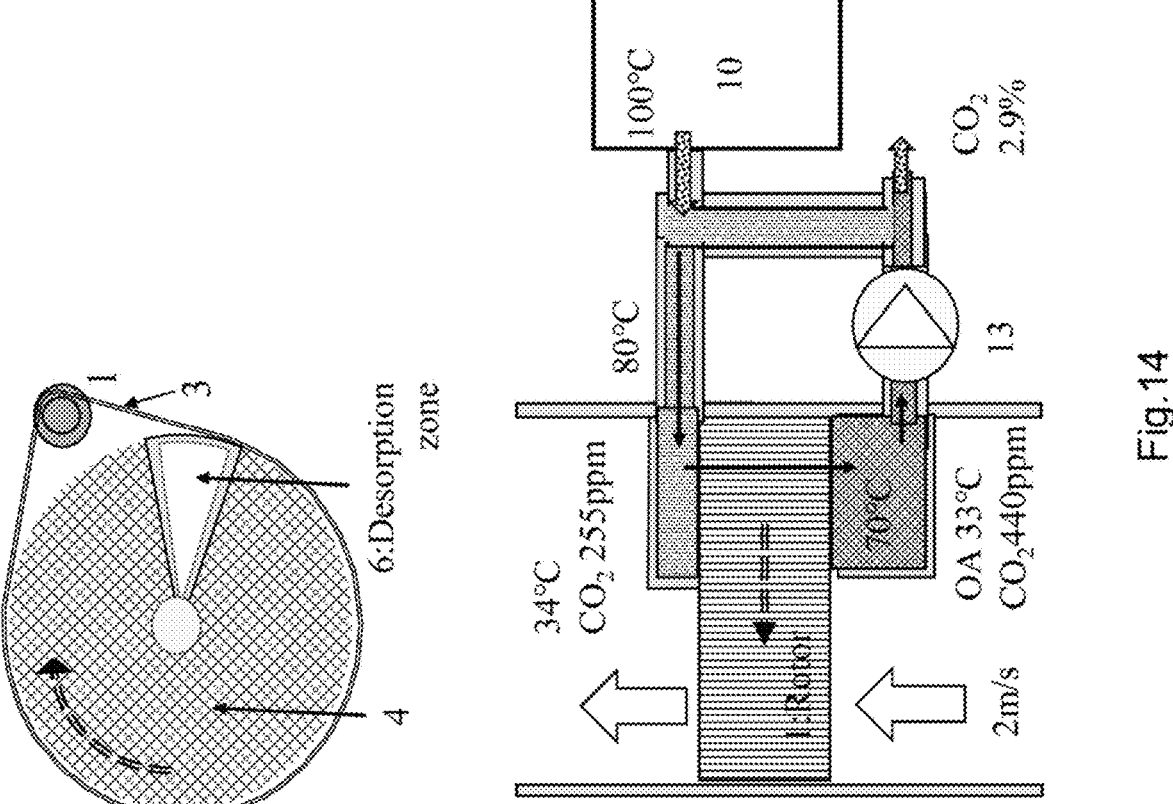
FIG. 14. Shows a schematic illustration of the wet TSA method experiment in Comparative Example 2.

Comparison Example 2 Next, a comparative example of the wet TSA method experimental apparatus FIG. 14 is shown. In the wet TSA method, carbon dioxide gas is desorbed by the condensation heat of water vapor, and the sorption heat is removed by the evaporation latent heat of condensate during carbon dioxide gas sorption to dramatically improve the recovery rate and concentration. Outside air was used as the process gas. Since the recovered gas is highly concentrated at high humidity, the carbon dioxide gas concentration meter is a diaphragm electrode method capable of measuring both the liquid and vapor phases, with a measurement concentration of 0.1 to 100%.

The carbon dioxide gas concentration on the process gas side was measured using a non-dispersive infrared (NDIR) method with a measurement concentration of 0 to 10,000 ppm.

The test rotor is of the same type and specifications as in Comparative Example 1. On the desorption side, saturated vapor with high energy density is used, so the desorption zone is much smaller as shown in FIG. 14, and the ratio of treated gas:desorption zone is 10:1. The same conditions are used on the treatment gas side, with a passage air velocity of 2 m/S. On the desorption side, while circulating the recovered carbon dioxide-containing gas, saturated steam of 100° C. is introduced and mixed to adjust the temperature to around 80° C. and then introduced into the desorption zone.

Figure 15:
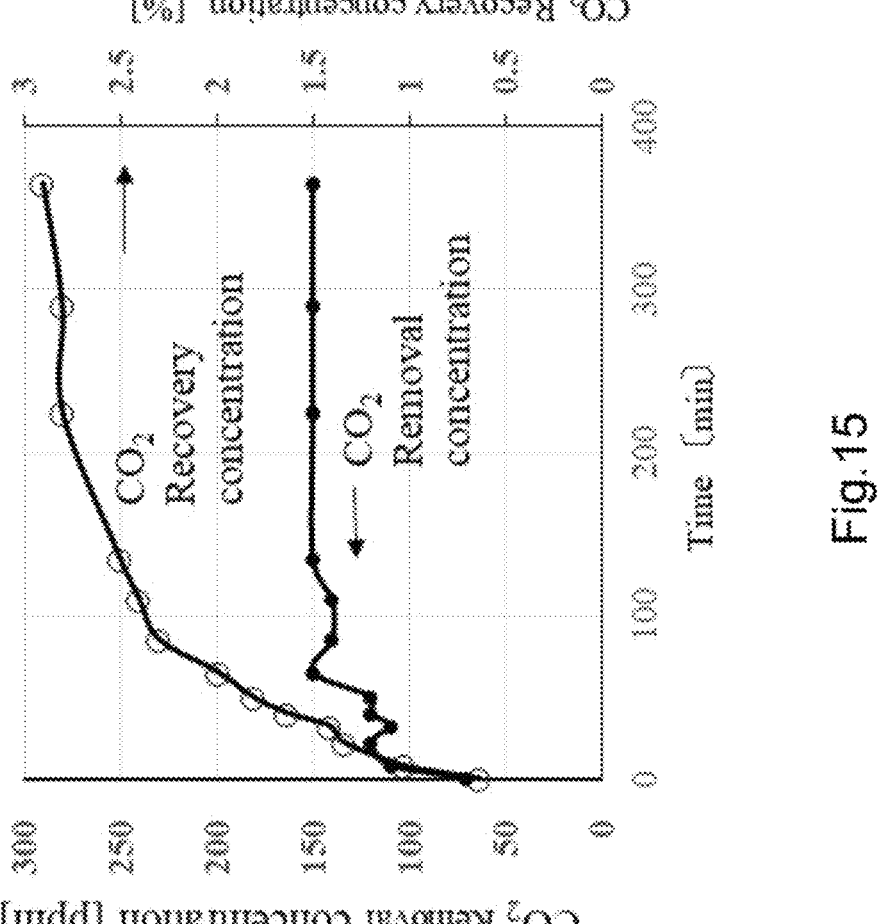
FIG. 15 Graph showing the time variation of carbon dioxide gas recovery concentration and recovery rate during the start-up of the experimental system in Comparative Example 2.
Figure 16:
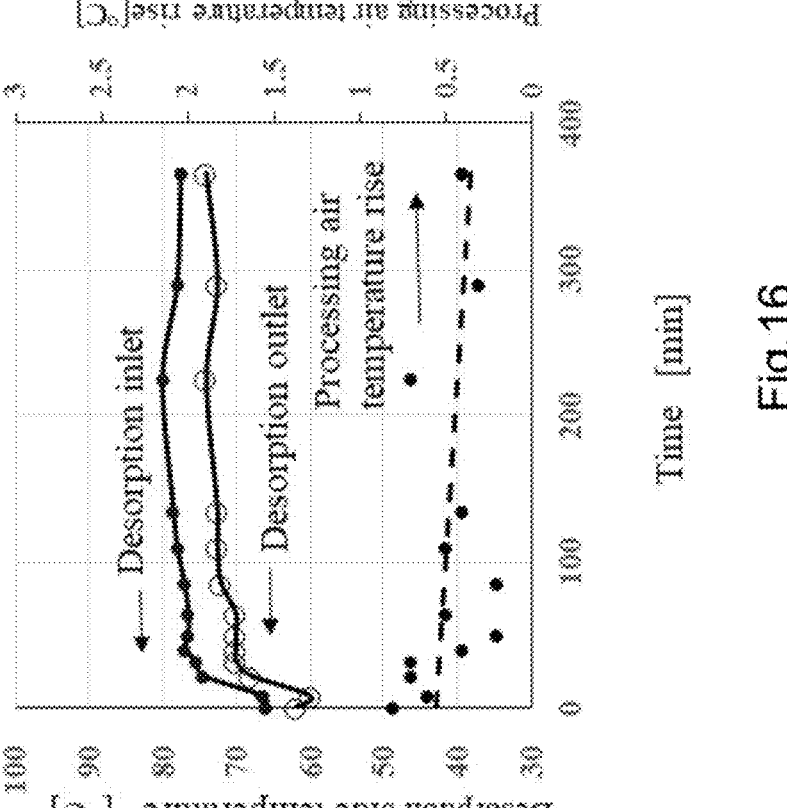
FIG. 16 Shows the temperatures at the rotor inlet and outlet of the desorption side circulation channel and the temperature rise of the treated air, AT, in Comparative Example 2.

FIGS. 15-16 show the experimental data. FIG. 15 shows a graph of the time variation of carbon dioxide gas recovery concentration and recovery rate during start-up of the system. After start-up, the recovery rate and recovered gas concentration reach equilibrium in about 1 to 2 hours and 3 hours, respectively. FIG. 16 shows the temperatures at the inlet and outlet of the rotor on the desorption side of the circulation channel. The temperature difference between the inlet and outlet is less than 10° C., and this energy difference is supplied by the introduction of 100° C. saturated steam from the steam humidifier. The temperature rise of the process side air, i.e., the inlet/outlet temperature difference, was only slightly less than 1° C. until the end of the experiment due to the vaporization cooling effect of the wet TSA method. The concentration of recovered gas was 2-3%, much higher than in Comparison 1, and no detectable performance degradation was observed during the four-month experiment.

Figure 17:
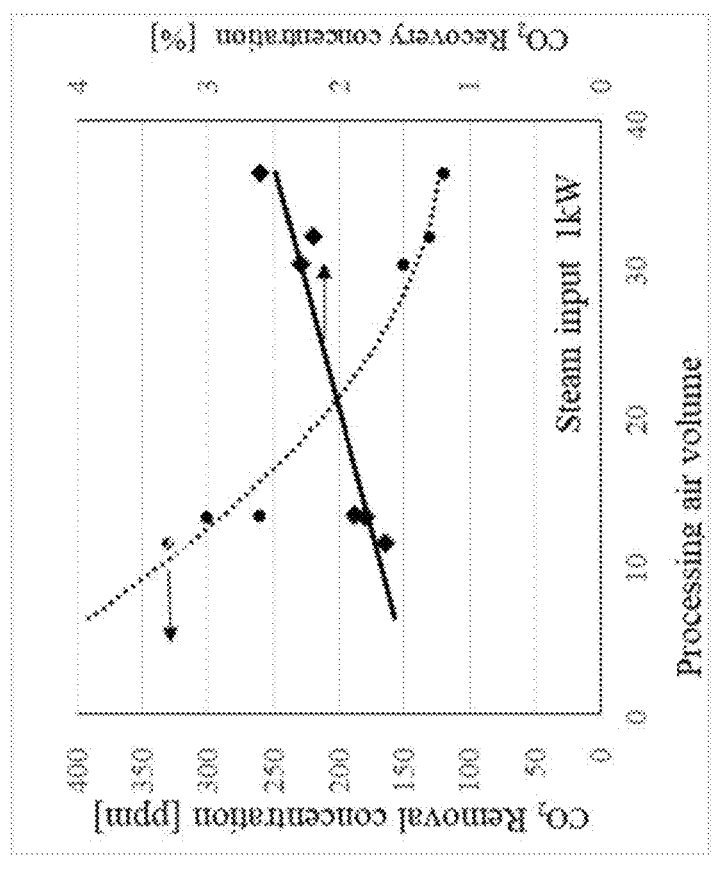
FIG. 17 Graph showing the effect of the ratio of treatment flow rate to desorption side circulation flow rate in Comparative Example 2.

FIG. 17 shows the relationship between the carbon dioxide gas recovery rate and the recovered concentration as the flow rate on the desorption/recovery circulation side is fixed and the treatment flow rate is increased or decreased. It was thought that increasing the flow rate on the process side would be a good way to increase the recovery concentration, but the effect was limited and the recovery rate decreased. A trade-off relationship was found whereby it is better to reduce the process flow rate when the removal rate=recovery rate is required.

Figure 18:
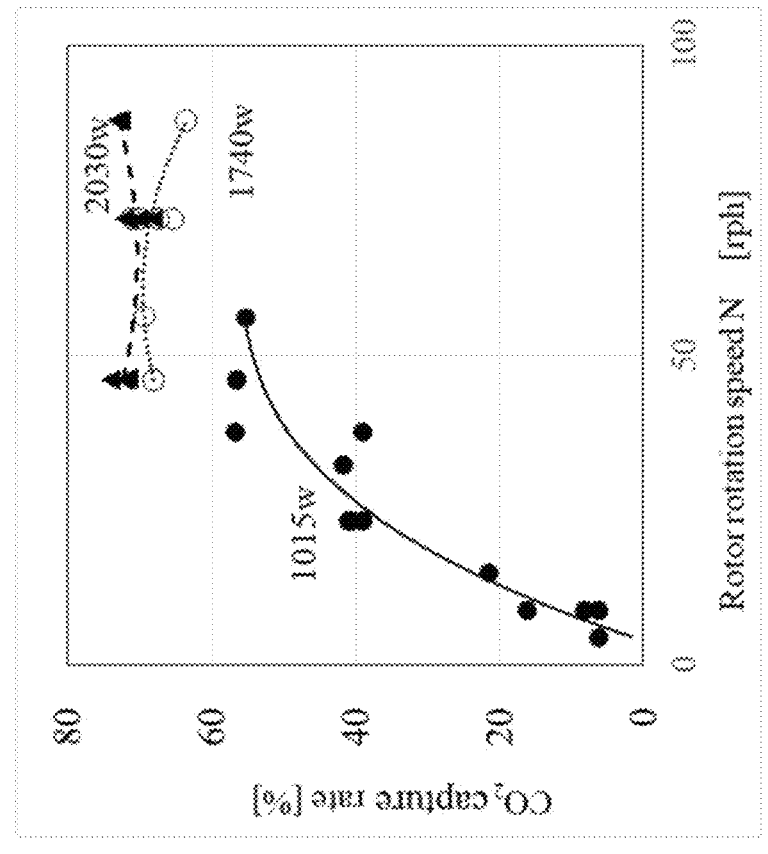
FIG. 18 Graph showing the performance improvement attempted by increasing the steam input in Comparative Example 2.

FIG. 18 shows the same experimental apparatus, in which an attempt was made to increase the vapor input to improve the carbon dioxide gas recovery rate and concentration. To avoid degradation of the sorbent, the desorption temperature was adjusted to about 80° C. by manipulating the amount of circulating gas on the desorption side and the rotor speed. The recovery rate was 50-70%, which was better than the dry TSA method in Comparative Example 1. The carbon dioxide gas recovery rate was improved by increasing the steam input and adjusting the rotor speed, but the effect of improving the recovery concentration was small. It was found that further breakthroughs are needed to improve the recovery concentration.

Figure 20:
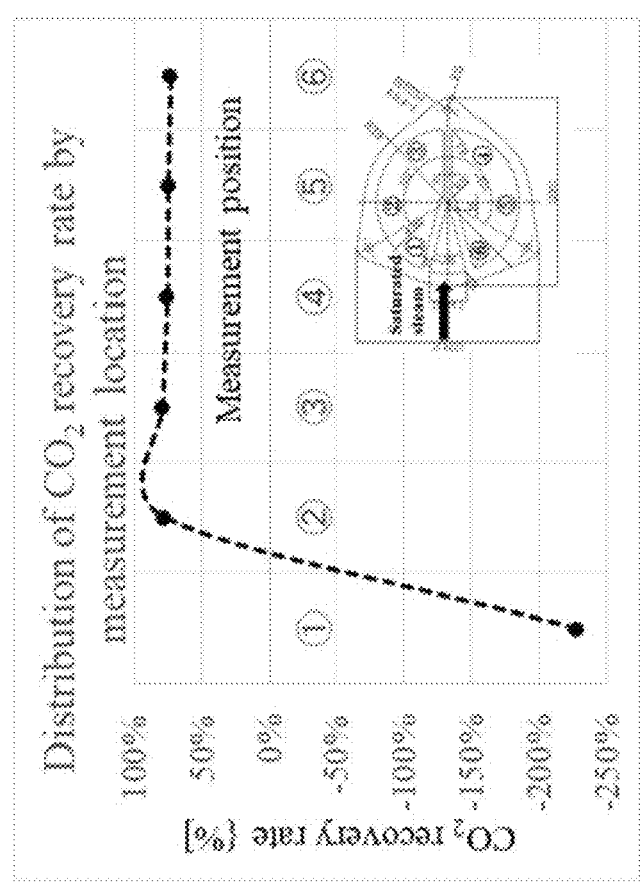
FIG. 20 Graph of the carbon dioxide recovery rate at the outlet of the process gas by rotor rotation angle in Comparative Example 2.
Figure 19:
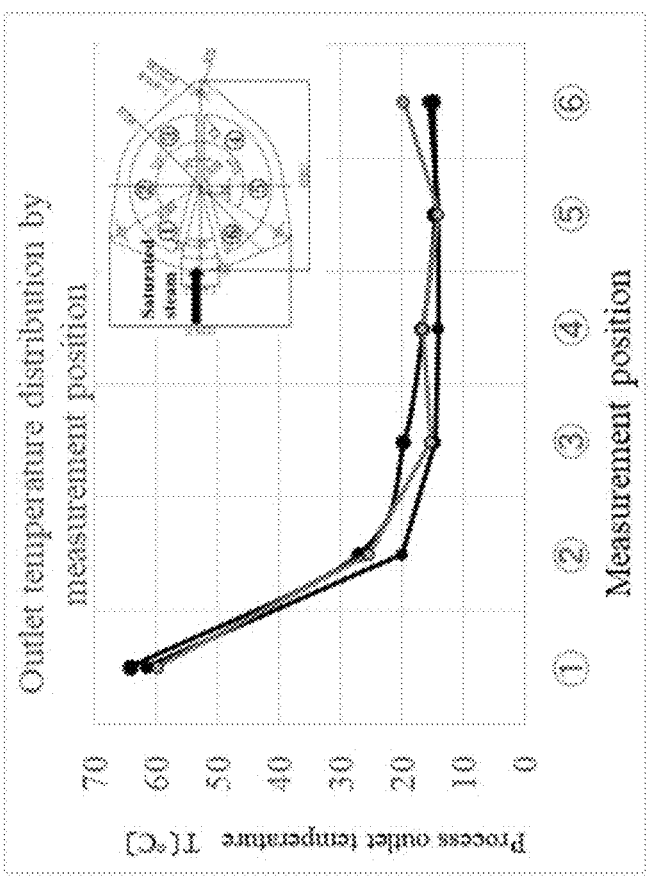
FIG. 19 Graph showing the distribution of temperature at the outlet of the process gas by rotor rotation angle in Comparative Example 2.

FIGS. 19-20 show the measured distribution of the temperature at the outlet of the process gas and the carbon dioxide gas recovery rate by rotor rotation angle. The three lines in FIG. 19 show the results of three measurements. The outlet temperature is high immediately after the rotation from the desorption zone to the process gas zone, and in FIG. 2 0, the recovery rate at the same location is significantly negative. In other words, the carbon dioxide gas concentration is higher than that of the process gas, and the migration of the adsorbed gas from the adsorption zone to the process gas zone due to rotor rotation was observed. This suggests that gas purging should be considered in order to increase the carbon dioxide gas recovery rate, and that it is also necessary to devise ways to prevent air from migrating from the treatment zone into the recovery and desorption zones, thereby reducing the recovery concentration.

Comparison Example 2 Prototype 1 of a portable carbon dioxide gas separator/concentrator (FIG. 2), which is designed to remove and reduce carbon dioxide gas from air-conditioned air and atmospheric air, and supply the recovered and concentrated carbon dioxide gas for vegetable growth promotion in a plant factory.

The test rotor is CD300×50 mm wide for portability. The honeycomb size is the same as in Examples 1 and 2 and is impregnated with amine sorbent. The zone configuration is almost the same as in Example 2, and an axial-flow exhaust fan is used on the process gas side because of its low pressure drop. On the desorption side, a small blower with variable air volume is used to configure the circulation path. Steam generated by the boiler of a household steam cleaner is introduced into the circulation path, and the gas from the circulation path is collected.

Figure 22:
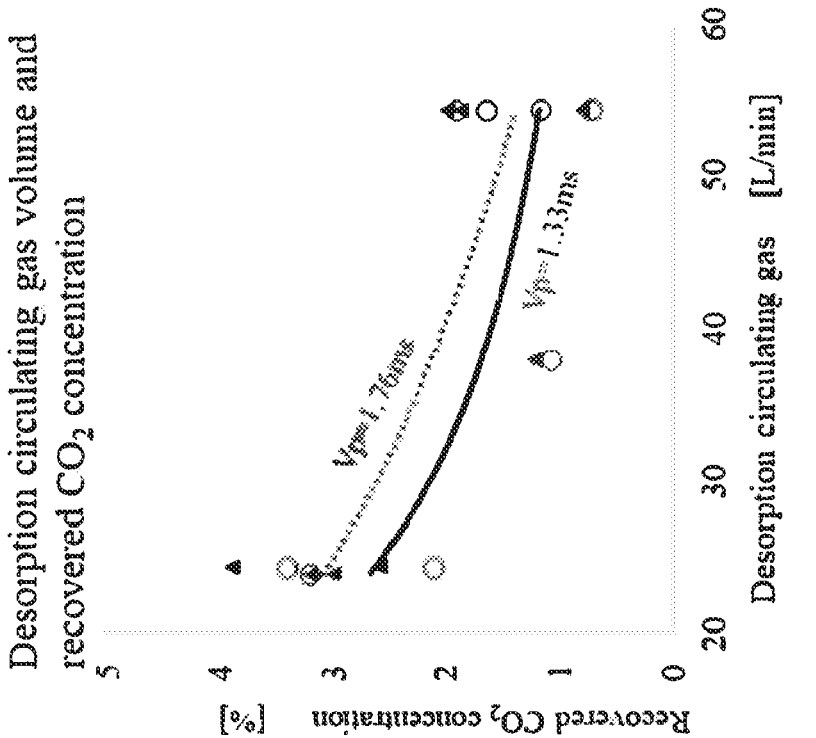
FIG. 22 Shows a graph comparing the effect of increasing the flow rate on the desorption circulation side and the effect of increasing the airflow on the treatment side of the test machine.
Figure 21:
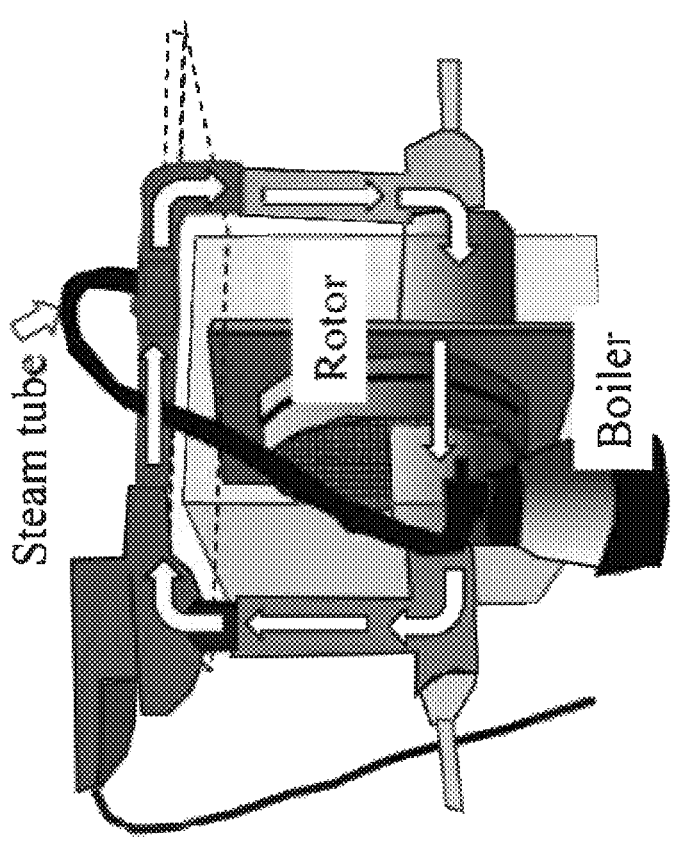
FIG. 21 Shows a photograph of the prototype test machineNo. 1, in Comparative Example 3.

The test results are shown in FIG. 22. This figure shows the effect on carbon dioxide gas concentration by adjusting the amount of desorption circulation gas and process-side air flow rate. Increasing the amount of desorption and circulation gas decreases the concentration of recovered carbon dioxide gas. This was considered to be due to an increase in gas leakage caused by an increase in differential pressure due to an increase in the circulating gas volume beyond the necessary level.

The air flow rate was increased from 269 CMH (1.33 m/S) to 356 CMH (1.76 m/S) by using two process fans. Although there was some improvement in the recovered concentration, the limit of the improvement was apparent, and the results indicate that further breakthroughs are needed for practical application.

Example 1 Portable prototype No. 2 uses the same wet TSA method as Comparative Examples 2 and 3. The air from which carbon dioxide gas is removed from the air is used for air conditioning. The concept is to supply the recovered and concentrated carbon dioxide gas to a plant factory for promoting vegetable growth. The rotor is the same as in Comparative Example 3.

In Comparative Examples 2 and 3, we felt that there were limits to both the recovery rate and concentration, so we considered and adopted a method in which saturated steam at 100° C. could be injected directly into the desorption zone. As shown in FIG. 2, the rotor is configured in the order of its rotation direction to pass through the treatment gas zone 4, the recovery zone 5, and the desorption zone 6 before returning to the treatment gas zone 4 again. Saturated vapor of nearly 100° C. is introduced into the desorption zone 6 to desorb carbon dioxide gas with the condensation heat of the saturated vapor, and the desorbed gas is introduced into and passed through the recovery zone 5 at the front of the rotor in the direction of rotation for recovery.

In the prototype test of Example 1, deformation and leakage occurred due to insufficient heat resistance of the foam board, so we considered countermeasures and proposed a "laminated structure purge and recovery block" that can be manufactured at low cost and with high precision even with a complex purge and flow configuration. Since the performance test of Example 1 was suspended and priority was given to Example 2, no test data was collected.

Example 2 Example 2 is configured as shown in FIG. 3 in the order of the direction of rotor rotation: treatment gas zone 4, treatment gas purge zone 7, recovery zone 5, desorption zone 6, desorption gas purge zone 8, and then back to treatment gas zone 4 again. Saturated vapor at nearly 100° C. is introduced into the desorption zone to desorb carbon dioxide gas by the condensation heat of the saturated vapor. The desorbed gas is introduced and passed through the recovery zone 5 at the front of the rotary direction for recovery.

The process gas in the honeycomb void moves to the process gas purge zone 7 due to rotor rotation, but the process gas is purged with gas from the desorption gas purge zone 8. Furthermore, the gas from the exit of the desorption zone 6 is passed through the recovery zone 5 and recovered, preventing oxygen from entering the hottest zone 6, and preventing oxygen from being mixed in. This prevents oxidative deterioration even when saturated steam of nearly 100° C. is injected.

From the honeycomb side, there is an effect of residual heat recovery from the gas passing through the recovery zone to preheat the honeycomb. At the same time, from the recovered gas side, the latent heat removal of the gas immediately after desorption has the effect of reducing the water vapor separation load of the recovered gas after recovery and improving the energy efficiency of the entire system. In addition, the gas exchange between the treatment gas purge zone 7 and the desorption gas purge zone 8 further improves the carbon dioxide gas recovery rate and concentration, as well as the energy saving effect.

FIG. 10 shows a photograph of the assembly of the portable type Prototype 2. The rotor is the same as in Comparative Example 3. Process air is sucked in through the opening in this figure and exhausted by a 41 W fan installed on the back side. 50 mm wide The honeycomb rotor has a low pressure drop, so an axial-flow ventilation fan was sufficient, with an air velocity of 3.4 m/s and an air volume of 7.3 CMM.

The portable type prototype No. 2 is a prototype based on the newly proposed "foam module board stacked unit structure. The "Rotor Cassette Module Board" 14 incorporates the carbon dioxide gas separation and concentration rotor and rotor drive unit into the foam board. The "Rotor End Faces Module board" 15 (front) and 16 (rear) incorporate the "Stacked Purge and Recovery Blocks" 18 into the foam board to form the flow paths and the rotor shaft center and both end faces are supported and sealed sliding. The "airflow system module board" 17 incorporates a process gas fan and purge air pump. Before assembly (Example 2) is shown in FIG. 6. The small boiler is built in the middle of several module boards. The stacked and assembled module boards are integrated to form the device shown in the photo in FIG. 10.

Figure 23:
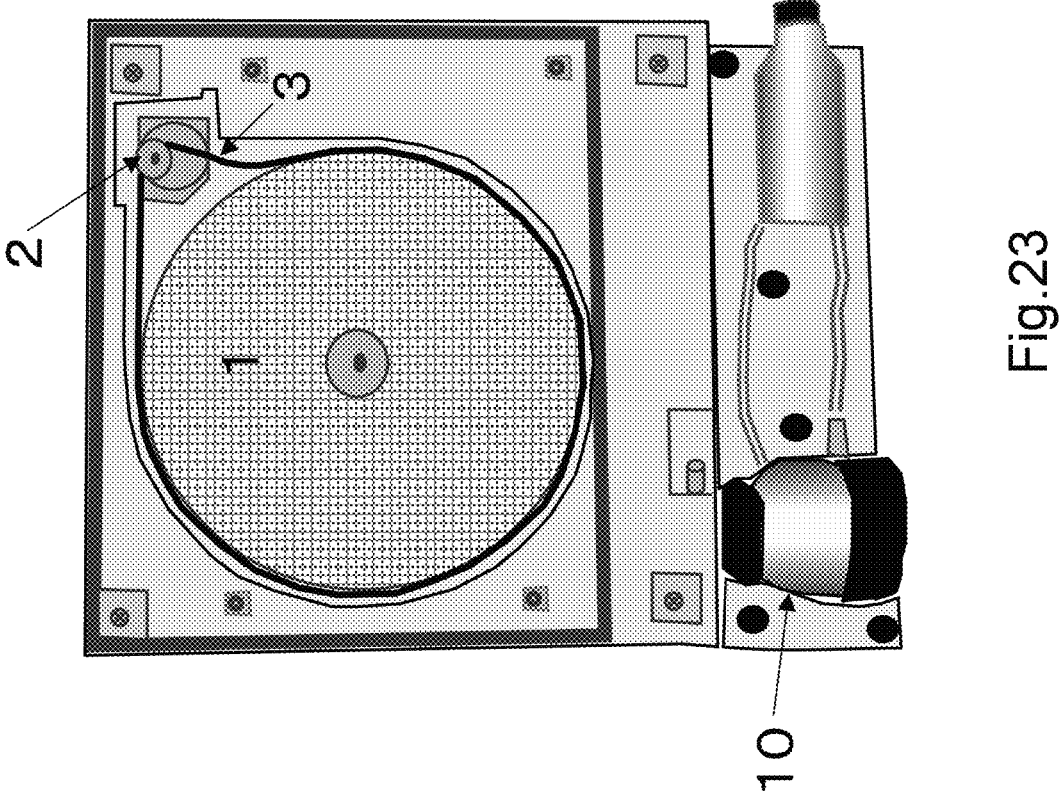
FIG. 23 Shows a photograph of the "rotor cassette module plate" of the prototype test machine No. 2, with the "rotor end face module plate" on the front side removed, as shown in Example 2.

FIG. 23 shows Prototype 2, in which the "rotor cassette module plate" 14 is visible after removing the "rotor end face module plate" 15 in the foreground. This prototype was made for a 50 mm wide rotor, but it can also be used for a wide rotor by replacing the foam board with a thicker one or stacking multiple layers. In the upper right corner is a 4W rotor drive motor, and diagonally below the rotor is a small 1 kw boiler and water tank, all embedded in insulation board for good thermal insulation.

The "laminated purge and recovery block" 18 must have heat resistance, heat insulation, flexibility, elasticity, sealing, sliding, and abrasion resistance. In this example, a foam silicone rubber plate is used. As shown in FIG. 7, a rubber plate with each zone space cut out, a rubber plate with a connecting passageway in each zone space, and a bottom plate with gas inlet and outlet tubes and no notches were fabricated, respectively. As shown in the photo in FIG. 8, silicone caulking is used to adhere and integrate.

Then, as shown in the photo in FIG. 9, incorporate them into the "rotor end face module board" 15 and 16. The surface layer sliding on the rotor end face is laminated with a glass cloth reinforced fluoroplastic sheet with excellent heat resistance, sliding and abrasion resistance to ensure sealing and sliding properties.

The steam boiler 10 was converted from parts of a 1 kW household steam cleaner; a reserve water tank was added to the 350 cc capacity to ensure an operating time of at least 15 minutes. For longer operation, an automatic water supply system from a tap or polyethylene tank can be used. A purge air pump 11 is built into the airflow system module plate 17 shown in the FIG. 6 photo, and a circulation tube to the purge zone is connected.

Figure 24:
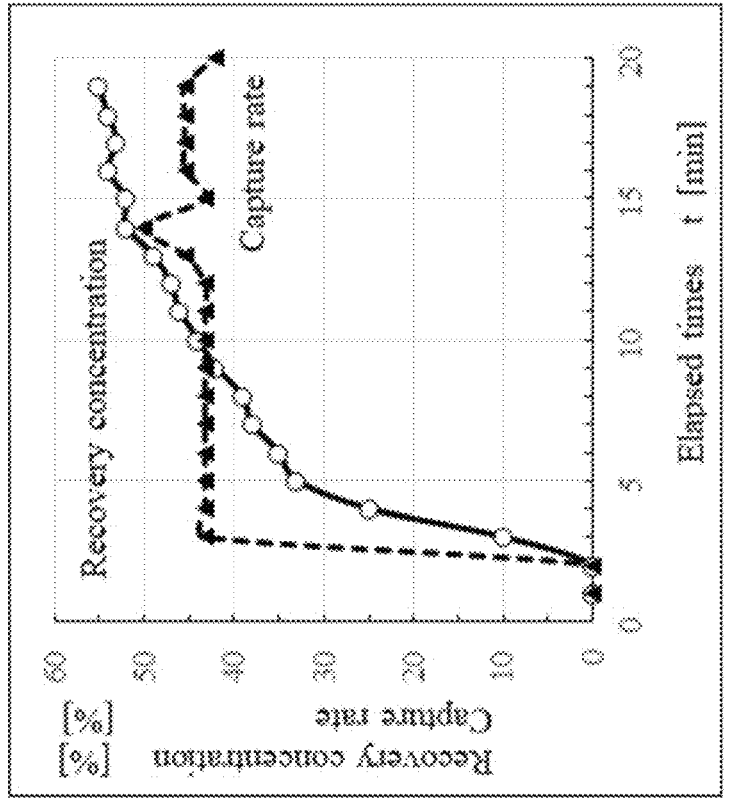
FIG. 24 Shows a graph of the recovery rate and concentration after the startup of the test equipment of the second prototype.

FIG. 24 shows the start-up situation after equipment start-up. In FIG. 15 of Comparative Example 2, the recovery rate took one hour to stabilize and 3 hours to reach a recovery concentration of 2.5%, even though the data was started after residual heat from the steam humidifier, whereas in FIG. 24 of Example 1, the recovery rate reached 45% in about 3 minutes after startup and the recovery concentration reached 50% in about 15 minutes, despite the startup time from the boiler water temperature.

The start-up time is overwhelmingly faster than in Comparison 2, which means that the thermal efficiency is superior. The gas contact area and the main body are highly insulated and have low thermal capacity, so there is little heat loss associated with the startup and shutdown of the equipment, and frequent startup and shutdown is easy. In both Comparative Examples 2 and 3, unexpected condensation water flowed out of the test apparatus, but in Example 2, no condensation water was generated except from the carbon dioxide gas collection tube. Therefore, heat loss due to insulation and residual heat of the equipment was almost completely eliminated.

Figure 25:
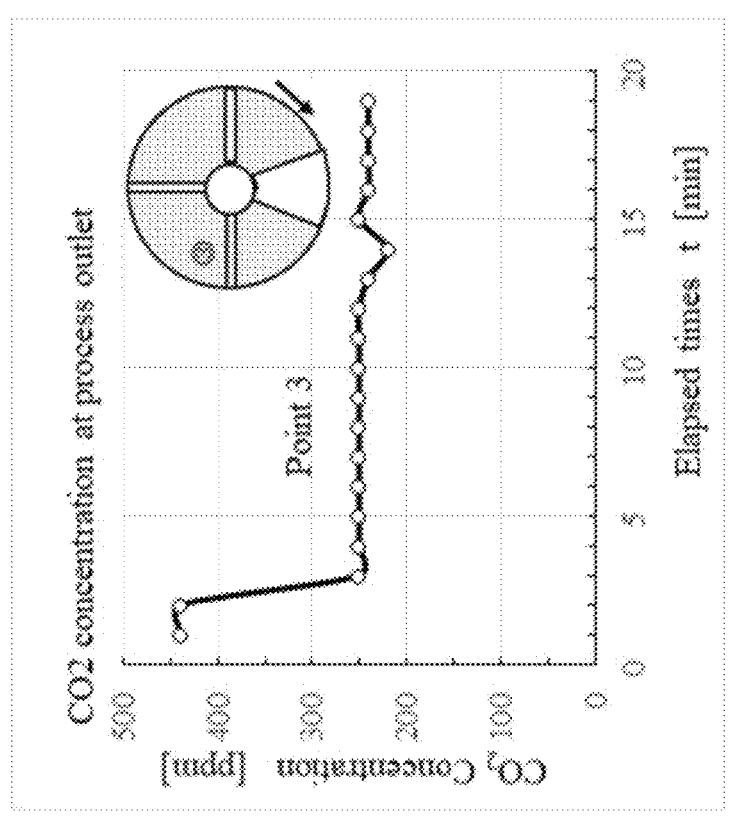
FIG. 25 Graph showing the change in the concentration of carbon dioxide at the treatment outlet after the startup of the test system in Example 2 of the second embodiment.

FIG. 25 shows the change in the concentration of carbon dioxide gas at the process outlet after startup, showing that outside air of about 440 ppm is reduced to about 250 ppm after 2 to 3 minutes of operation and is then supplied stably. If this air is used for air conditioning, an intellectual productivity effect can be expected. The carbon dioxide gas recovery rate was about 45%, but the rotor width was 50 mm wide and the flow velocity on the process side was 3.3 m/S. In contrast, the data of the dry TSA method (Example 1) shows the same removal rate at 200 mm width and 2 m/S. This shows the superiority of the wet TSA method.

Figure 26:
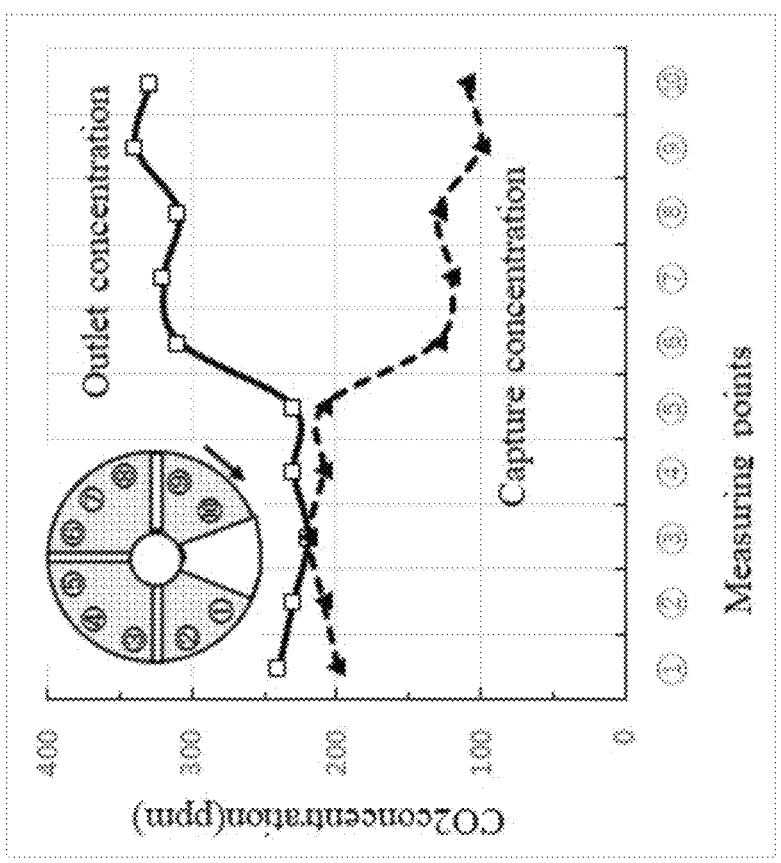
FIG. 26 Shows a graph of the carbon dioxide concentration at the outlet of the treatment side by rotor rotation angle and the concentration of carbon dioxide gas recovered.

FIG. 26 shows measured carbon dioxide gas concentrations by rotation angle at the process zone outlet. The recovered (removed) concentration, which is the outside air concentration minus the process exit concentration, is also shown. The carbon dioxide gas concentration was sufficiently low even at the point immediately after the rotation from the desorption gas purge zone to the process zone, and no carbon dioxide gas concentration higher than the process gas concentration was observed, as in Comparative Example 2, thus confirming the effectiveness of the circulation purge zone.

Figure 27:
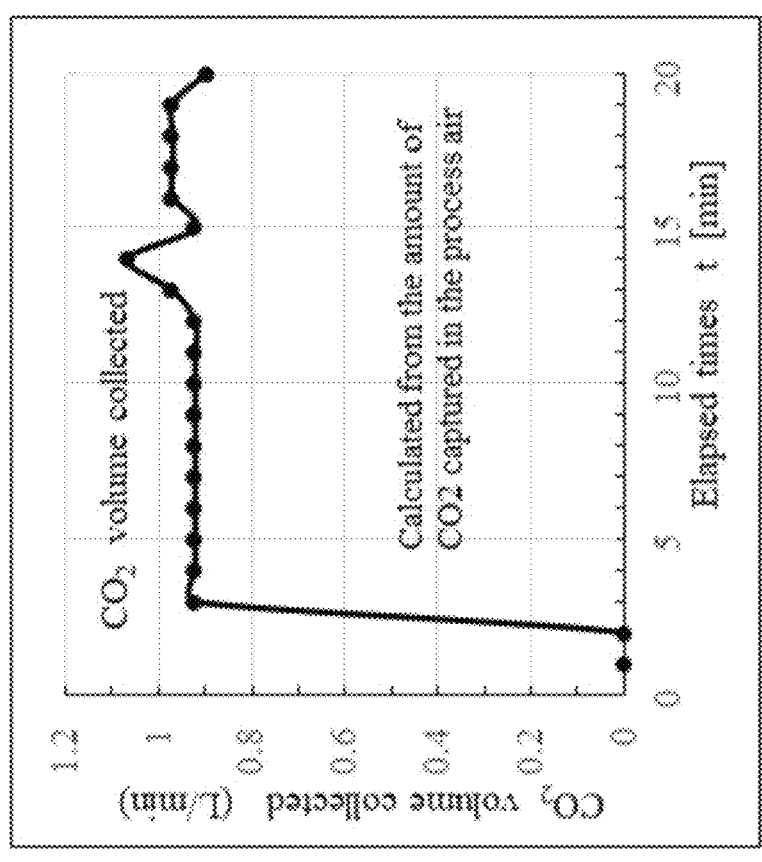
FIG. 27 Shows a graph of the time variation of the amount of carbon dioxide gas recovered after the startup of the test equipment in Example 2 of the second embodiment.

FIG. 27 shows the transition of carbon dioxide gas recovery after startup; equilibrium was reached in about 3 minutes, and the carbon dioxide gas recovery was almost stable at 0.9 liters per minute. This data shows a recovery concentration of 50% while the rotor rotation speed and purge gas flow rate were still being optimized, and since a concentration of 100% was measured in the course of the experiment, it is thought that a concentration close to 100% is possible if the parameters are optimized.

This proposal relates to a wet TSA method carbon dioxide gas separation and concentration device that can separate and concentrate carbon dioxide gas at a high recovery rate, is highly durable, can use waste heat of around 100° C., is energy efficient, inexpensive, and easily compacted. Since carbon dioxide gas can be separated and concentrated not only from flue gas but also from air and air conditioned air, the air with reduced carbon dioxide gas concentration can be used for air conditioning and ventilation, and the recovered highly concentrated carbon dioxide gas can be supplied to plant factories, etc. to contribute to improved vegetable productivity.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

What is claimed is:

1. A carbon dioxide gas separation and concentration system, comprising:

a rotor having a sorption ability for carbon dioxide;

a sealed casing accommodating the rotor and rotationally supporting the rotor, the sealed casing having at least a treatment gas zone, a recovery zone and a desorption zone in an order of rotor rotation, the recovery and desorption zones being formed from a stack of material layers, the material layers having an insulated construction to at least reduce condensate produced in the recovery and desorption zones, the rotor being brought into contact with a mixed gas containing carbon dioxide gas in the treatment gas zone while the rotor is moistened with condensate, to sorb carbon dioxide gas while evaporating and cooling the condensate; and a vaporizer to produce saturated vapor at approximately the normal boiling point of water at current atmospheric and operating conditions, the vapor being introduced into the desorption zone to desorb carbon dioxide sorbed in the treatment gas zone, by condensation heat of the vapor, the carbon dioxide being collected in the recovery zone.

2. The carbon dioxide gas separation and concentration system according to claim 1, wherein the mixed gas containing carbon dioxide is supplied to an inlet of the treatment gas zone, the mixed gas containing carbon dioxide is outside air or conditioned air from a building, outlet air having carbon dioxide sorbed is produced at an outlet of the treatment gas zone, and the outlet air having carbon dioxide sorbed is supplied to an air conditioning system to condition air in a building.

3. The carbon dioxide gas separation and concentration system according to claim 1, wherein the rotor is incorporated into a rotor cassette module foam board together with a drive system for rotating the rotor, the drive system comprising a drive motor and a drive belt, the rotor cassette module foam board is sandwiched between a front face module plate and a rear face module plate, the front face module plate and the rear face module plate holding a rotor shaft to support the rotor, the front face module plate and the rear face module plate sealing both sides of the rotor, the front face module plate and the rear face module plate together form the recovery and desorption zones, the front face module plate being formed from a front stack of material layers, the rear face module plate being formed from a rear stack of material layers, the front and rear stacks of material layers each comprising at least one heat-resistant foam rubber plate, the material layers of the front stack of material layers and the rear stack of material layers have spaces therein to define at least one gas passageway in the front stack of material layers and at least one gas passageway in the rear stack of material layers, and an airflow system module board incorporates a process gas blower that blows the mixed gas containing carbon dioxide, the airflow system module board being laminated to the front face module plate or the rear face module plate.

4. The carbon dioxide gas separation and concentration system according to claim 1, wherein the stack of material layers is a fan-shaped block structure covering a fan-shaped portion of the rotor, the stack of material layers comprises:

at least two laminated foam rubber passage layers, each passage layer having a zone space selectively formed therein such that when the passage layers are laminated, the zone spaces together form a continuous passageway through the passage layers;

a heat-resistant and abrasion-resistant sliding sheet that defines a sliding surface in contact with an end face of the rotor, the heat-resistant and abrasion-resistant sliding sheet being provided on a first side of the passage layers; and a heat-insulating plate without a zone space, the heat-insulating plate being provided on a second side of the passage layers, opposite the heat-resistant and abrasion-resistant sliding sheet, wherein a vapor introduction section is in communication with at least one zone space, to introduce vapor into the stack of material layers, and a desorption gas collection section is in communication with at least one zone space, to collect gas from the stack of material layers.

5. A carbon dioxide gas separation and concentration system, comprising:

a rotor having a sorption ability for carbon dioxide;

a sealed casing accommodating the rotor and rotationally supporting the rotor, the casing having at least a treatment gas zone, a treatment gas purge zone, a recovery zone, a desorption zone, and a desorption gas purge zone, in an order of rotor rotation, the treatment gas purge zone, the recovery zone, the desorption zone, and the desorption gas purge zone being formed from a stack of material layers, the material layers having an insulated construction to at least reduce condensate produced therein, the stack of material layers defining a channel to circulate gas between the treatment gas purge zone and the desorption gas purge zone, the rotor being brought into contact with a mixed gas containing carbon dioxide in the treatment gas zone, while the rotor is moistened with condensate, to sorb carbon dioxide while evaporating and cooling the condensate; and a vaporizer to produce saturated vapor at approximately the normal boiling point of water at current atmospheric and operating conditions, the vapor being introduced into the desorption zone to desorb carbon dioxide sorbed in the treatment gas zone, using condensation heat of the vapor, the carbon dioxide being recovered in the recovery zone.

6. The carbon dioxide gas separation and concentration system according to claim 5, wherein the mixed gas containing carbon dioxide is supplied to an inlet of the treatment gas zone, the mixed gas containing carbon dioxide is outside air or conditioned air from a building, air having carbon dioxide sorbed is produced at an outlet of the treatment gas zone, and the air having carbon dioxide sorbed is sent to an air conditioner to condition air in a building.

7. The carbon dioxide gas separation and concentration system according to claim 5, wherein the rotor is incorporated into a rotor cassette module foam board together with a drive system for rotating the rotor, the drive system comprising a drive motor and a drive belt, the rotor cassette module foam board is sandwiched between a front face module plate and a rear face module plate, the front face module plate and the rear face module plate holding a rotor shaft to support the rotor, the front face module plate and the rear face module plate sealing both sides of the rotor, the front face module plate and the rear face module plate together form the treatment gas purge zone, the recovery zone, the desorption zone, and the desorption gas purge zone, the front face module plate being formed from a front stack of material layers, the rear face module plate being formed from a rear stack of material layers, the front and rear stacks of material layers each comprising at least one heat-resistant foam rubber plate, the material layers of the front stack of material layers and the rear stack of material layers have spaces therein to define at least one gas passageway in the front stack of material layers and at least one passageway in the rear stack of material layers, and an airflow system module board incorporates a process gas blower that blows the mixed gas containing carbon dioxide, the airflow system module board being laminated to the front face module plate or the rear face module plate.

8. The carbon dioxide gas separation and concentration system according to claim 5, wherein the stack of material layers is a fan-shaped block structure covering a fan-shaped portion of the rotor, the stack of material layers comprises:

at least two laminated foam rubber passage layers, each passage layer having a zone space selectively formed therein such that when the passage layers are laminated, the zone spaces together form at least one continuous passageway through the passage layers;

a heat-resistant and abrasion-resistant sliding sheet that defines a sliding surface in contact with an end face of the rotor, the heat-resistant and abrasion-resistant sliding sheet being provided on a first side of the passage layers; and a heat-insulating plate without a zone space, the heat insulating plate being provided on a second side of the passage layers, opposite the heat-resistant and abrasion-resistant sliding sheet, wherein a vapor introduction section is in communication with at least one zone space, to introduce vapor into the stack of material layers, and a desorption gas collection section is in communication with at least one zone space, to collect gas from the stack of material layers.

9. The carbon dioxide gas separation and concentration system according to claim 8, wherein the continuous passageway connects the treatment gas purge zone and the desorption gas purge zone.

10. A carbon dioxide gas separation and concentration system, comprising:

a rotor having a sorption ability for carbon dioxide;

a sealed casing accommodating the rotor and rotationally supporting the rotor, the casing having at least a treatment gas zone, a treatment gas purge zone, a desorption zone, and a desorption gas purge zone, in an order of rotor rotation, the treatment gas purge zone, the desorption zone, and the desorption gas purge zone being formed from a laminated stack of layers, the laminated stack of layers defining a channel to circulate gas between the treatment gas purge zone and the desorption gas purge zone, the rotor being brought into contact with a mixed gas containing carbon dioxide in the treatment gas zone, while the rotor is moistened with condensate, to sorb carbon dioxide while evaporating and cooling the condensate; and a vapor source to produce saturated vapor for introduction into the desorption zone to desorb carbon dioxide sorbed in the treatment gas zone, wherein the laminated stack of layers comprises a block structure covering at least a fan-shaped portion of the rotor, the stack of material layers comprises:

at least two laminated passage layers, each passage layer having a zone space selectively formed therein such that when the passage layers are laminated, the zone spaces together form the channel to circulate gas between the treatment gas purge zone and the desorption gas purge zone.

11. The carbon dioxide gas separation and concentration system according to claim 10, wherein the stack of material layers further comprises:

a heat-resistant and abrasion-resistant sliding sheet that defines a sliding surface in contact with an end face of the rotor, the heat-resistant and abrasion-resistant sliding sheet being provided on a first side of the passage layers; and a heat-insulating plate without a zone space, the heat insulating plate being provided on a second side of the passage layers, opposite the heat-resistant and abrasion-resistant sliding sheet, wherein a vapor introduction section is in communication with at least one zone space, to introduce vapor into the stack of material layers, and a desorption gas collection section is in communication with at least one zone space, to collect gas from the stack of material layers.

12. The carbon dioxide gas separation and concentration system according to claim 10, wherein the mixed gas containing carbon dioxide is supplied to an inlet of the treatment gas zone, the mixed gas containing carbon dioxide is outside air or conditioned air from a building, air having carbon dioxide sorbed is produced at an outlet of the treatment gas zone, and the air having carbon dioxide sorbed is sent to an air conditioner to condition air in a building.

13. The carbon dioxide gas separation and concentration system according to claim 10, wherein the rotor is incorporated into a rotor cassette module board together with a drive system for rotating the rotor, the rotor cassette module board is sandwiched between a front face module plate and a rear face module plate, the rear face module plate contains the laminated stack of layers comprising the block structure, the front face module plate and the rear face module plate together form the treatment gas purge zone, the desorption zone, and the desorption gas purge zone, the front face module plate comprises a channeling section provided opposite to the block structure provided on the rear face module plate, such that together, the channeling section and the block section sandwich at least the fan-shaped portion of the rotor, and the channeling section of the front plate module plate completes the channel to circulate gas between the treatment gas purge zone and the desorption gas purge zone such that gas passes through one of the treatment gas purge zone and the desorption gas purge zone, then is channeled through the block section of the rear face module plate, then passes through the other of the treatment gas purge zone and the desorption gas purge zone, then is channeled through the channeling section of the front face module plate.

14. The carbon dioxide gas separation and concentration system according to claim 13, further comprising a purge pump to propel gas between the treatment gas purge zone and the desorption gas purge zone.

* * * * *